United States Patent
Konishi

(10) Patent No.: US 9,357,124 B2
(45) Date of Patent: May 31, 2016

(54) FOCUSING CONTROL DEVICE AND CONTROLLING METHOD OF THE SAME

(71) Applicant: CANON KABUSHIKI KAISHA, Tokyo (JP)

(72) Inventor: Kazuki Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/850,831

(22) Filed: Sep. 10, 2015

(65) Prior Publication Data

US 2016/0080636 A1     Mar. 17, 2016

(30) Foreign Application Priority Data

Sep. 12, 2014  (JP) .................................. 2014-186857

(51) Int. Cl.
*H04N 5/232*        (2006.01)

(52) U.S. Cl.
CPC ....... *H04N 5/23212* (2013.01); *H04N 5/23219* (2013.01)

(58) Field of Classification Search
CPC ................................................ H04N 5/23212
See application file for complete search history.

(56) References Cited

U.S. PATENT DOCUMENTS

| | | | |
|---|---|---|---|
| 4,762,986 A * | 8/1988 | Suda .................. | H04N 5/23212 250/201.2 |
| 2008/0031611 A1* | 2/2008 | Konishi ................. | G03B 13/32 396/102 |
| 2008/0143865 A1* | 6/2008 | Kimoto .................... | G02B 7/36 348/345 |
| 2010/0067891 A1* | 3/2010 | Uenishi .................... | G02B 7/36 396/104 |

FOREIGN PATENT DOCUMENTS

| | | |
|---|---|---|
| JP | 2002-122773 A | 4/2002 |
| JP | 4185741 B2 | 11/2008 |
| JP | 4235422 B2 | 3/2009 |
| JP | 2013-057960 A | 3/2013 |

* cited by examiner

*Primary Examiner* — W B Perkey
(74) *Attorney, Agent, or Firm* — Canon USA Inc., IP Division

(57) ABSTRACT

A focusing control device that can keep a moving subject in focus and can prevent significant defocusing of a low contrast subject or under a low-light intensity condition during continuous shooting. The focusing control device determines whether an in-focus position of a focusing lens can be obtained, predicts an in-focus position for the current exposure operation based on an in-focus position for the previous exposure operation when continuous main exposure operation is performed for shooting, and determines whether prediction of an in-focus position is possible. When prediction of an in-focus position for the current exposure operation is determined to be not possible, the focusing control device performs a scan operation to obtain an in-focus position based on an in-focus position of the previous exposure operation where obtaining of an in-focus position of the focusing lens was determined to be possible.

7 Claims, 14 Drawing Sheets

FOCUSING CONTROL DEVICE AND CONTROLLING METHOD OF THE SAME

BACKGROUND OF THE INVENTION

1. Field of the Invention

The present invention relates to a focusing control device that performs focusing by using image signals obtained by an imaging element performing photoelectric conversion of subject images focused by a photographic optical system.

2. Description of the Related Art

Conventionally, various techniques of autofocus (AF) during continuous shooting of a camera have been proposed. For example, Japanese Patent Application Laid-Open No. 2002-122773 discloses a technique as described below.

A scan area of a focusing lens may be determined that areas of the same width are distributed on both sides of the current in-focus position. Alternatively, according to a view point described below, a scan area may be determined such that different widths of area are distributed on both sides taking the current in-focus position as a reference.

During a continuous shooting, images are continuously taken at a short time interval and the moving direction of a subject is usually the same among successive shootings. So that, based on the moving direction of the subject during previous shootings, in other words, based on the driving direction of a focusing lens (moving direction of the focusing lens) during previous shootings, the in-focus position for the next shooting can be predicted by some degree.

FIGS. 13A to 13C illustrate in-focus positions at successive three shootings. In the shooting illustrated in FIG. 13C, the in-focus position in the previous shooting (FIG. 13B) is taken as a reference point and distributed scan areas (SC1 and SC2) in opposite sides of the reference point are set differently based on the moving directions of the in-focus positions in previous shooting (FIG. 13B) and the shooting before the previous shooting (FIG. 13A). The distributed scan area on the side to which the moving direction of a subject in previous shootings is directed is relatively set wide.

As in this manner, by varying distributed scan areas based on the moving direction of the in-focus position in previous shootings, the focusing lens can be driven efficiently and the speed of focusing process can be raised.

Japanese Patent Application Laid-Open No. 2013-57960 discloses a technique of cutting down on unnecessary lens drive by stopping the focusing lens when it is determined that a subject is not moving toward or away from a camera and keeping the lens stopped until the subject moves, changing the distance.

However, the technique disclosed in Japanese Patent Application Laid-Open No. 2002-122773 only scales distributed scan areas and does not change the reference point, and thus cannot be applied for a scene where the shifting speed of an image plane gradually increases. For a typical subject that approaches at a constant speed, the shifting speed of an image plane increases at an accelerated rate. Conventional techniques thus may have difficulty in focusing a typical moving subject.

Moreover, since the processing is unchanged regardless of the result of scanning, when focus cannot be set on a subject after scanning, inappropriately distributed scan areas may cause continuation of false focusing even for a still subject.

In the technique disclosed in Japanese Patent Application Laid-Open No. 2013-57960, it often happens that reliability of prediction for a low contrast subject or under a low-light intensity condition is determined to be low and the future position of a moving subject cannot be predicted, which may cause difficulty in continuously focusing the moving subject.

SUMMARY OF THE INVENTION

One aspect of present invention is directed to a focusing control device that can keep a moving subject in focus during continuous shooting and can prevent significant defocusing of a low contrast subject or under a low-light intensity condition.

The aspect, among others, is achieved by providing a focusing control device including a scan control unit that performs a scan operation to sequentially acquire focus evaluation values from image signals by moving a focusing lens, a focus determination unit that determines whether an in-focus position of the focusing lens can be obtained based on the focus evaluation values, a prediction unit that predicts an in-focus position for a current exposure operation based on the in-focus position for a previous exposure operation when continuous main exposure operation is performed for shooting an image, and a prediction determination unit that determines whether prediction of the in-focus position is possible. When the prediction determination unit determines that prediction of the in-focus position for the current exposure operation is not possible, the scan control unit performs a scan operation to obtain an in-focus position based on an in-focus position of the previous exposure operation where obtaining of an in-focus position was determined to be possible by the focus determination unit.

Further aspects and advantageous features of the present invention will become apparent from the following description of exemplary embodiments with reference to the attached drawings.

DESCRIPTION OF THE EMBODIMENTS

Embodiments of the present invention will now be described in detail referring to the attached drawings.

Figure 1:
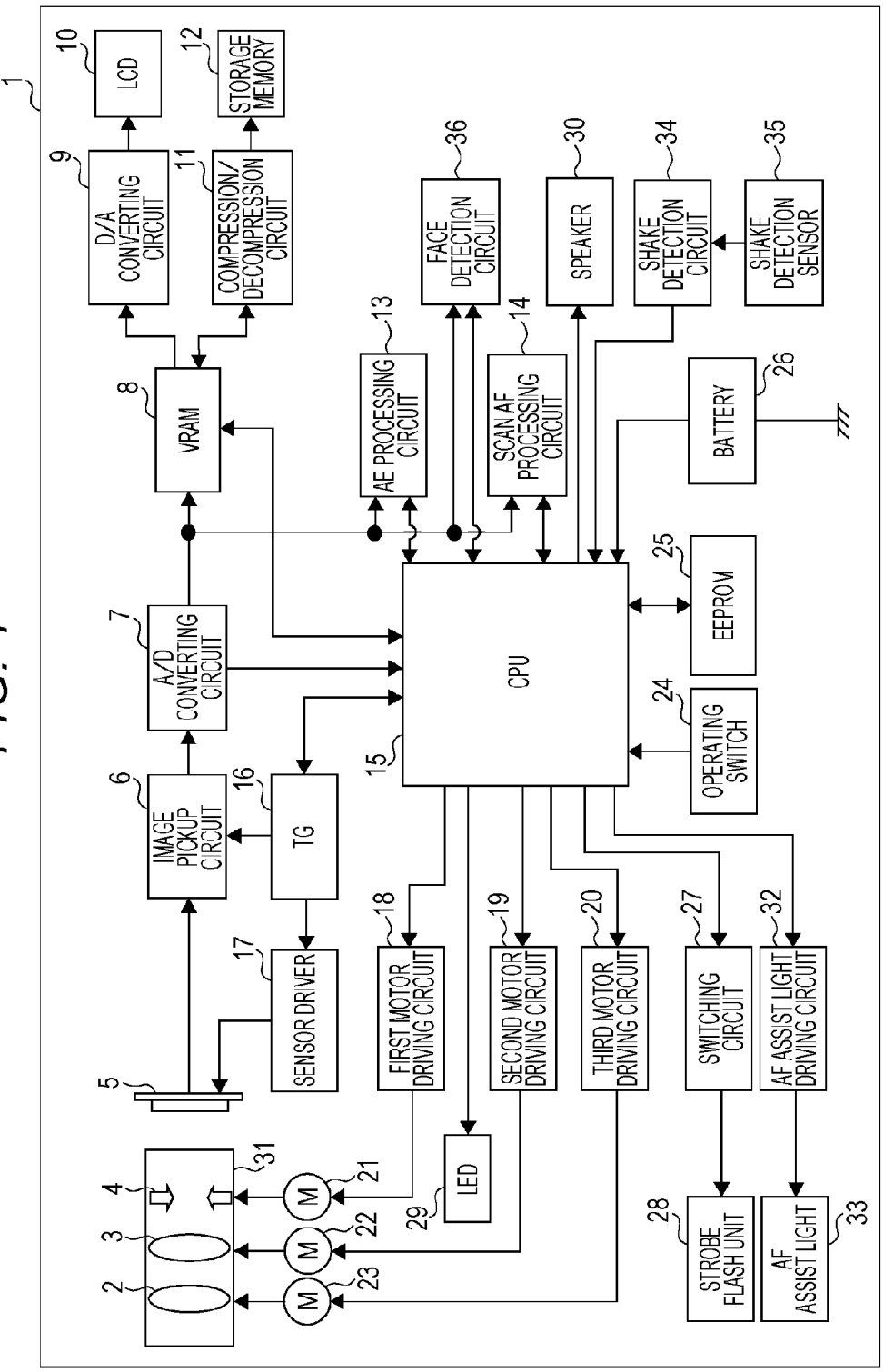
FIG. 1 is a block diagram illustrating a configuration of an imaging device according to a first embodiment of the present invention.

FIG. 1 is a block diagram illustrating a configuration of an imaging device 1 according to a first embodiment of the present invention. The imaging lens sleeve 31 illustrated in FIG. 1 includes a zoom lens group 2, a focusing lens group 3, a zoom lens group 2, and a diaphragm 4. The diaphragm 4 adjusts the amount of a light beam passing through an imaging optical system including the focusing lens group 3. An imaging sensor (also referred to as "imaging element" or "imaging device") 5 focuses a subject image passing through the imaging optical system and performs photoelectric conversion of a subject image. Any of a CMOS sensor or a CCD sensor may be used as the imaging element 5. On receiving electrical signals resulting from the photoelectric conversion from the imaging element 5, an image pickup circuit 6 performs various types of image processing to produce image signals. An A/D converting circuit 7 converts analogue image signals produced by the image pickup circuit 6 into digital image signals. A memory (VRAM) 8 constitutes a buffer memory or the like which temporarily stores the image signals output from the A/D converting circuit 7. A D/A converting circuit 9 reads out the image signals stored in the VRAM 8 and converts the image signals into analogue signals which are then converted into image signals having a form suitable for reproduced output. An image display unit (hereinafter referred to as "LCD") 10 is configured with a liquid crystal display (LCD) or the like which displays image signals resulting from conversion performed by the D/A converting circuit 9. A storage memory 12 is configured with a semiconductor memory or the like which stores image data. A compression/decompression circuit 11 includes a compression circuit that reads image signals temporarily stored in the VRAM 8 and performs compression processing or coding processing to process image data into a suitable form to be stored in the storage memory 12. The compression/decompression circuit 11 also includes a decompression circuit that performs decoding processing or decompression processing to process the image data stored in the storage memory 12 into an optimum form for reproduced display.

On receiving an output from the A/D converting circuit 7, an AE processing circuit 13 performs auto exposure (AE) processing. On receiving an output from the A/D converting circuit 7, a scan AF processing circuit 14 performs processing of automatic focus detection and automatic focusing (AF) to produce an AF evaluation value (focus evaluation value). A central processing unit (CPU) 15 (e.g., a microprocessor made of one or more integrated circuits) includes a memory used for computation of control of the entire imaging device 1. A timing generator (hereinafter referred to as "TG") 16 produces timing signals, and a sensor driver 17 drives the imaging element 5 on receiving a timing signal from the TG 16. A diaphragm driving motor 21 drives the diaphragm 4, and a first motor driving circuit 18 performs drive control of the diaphragm driving motor 21. A focus driving motor 22 drives the focusing lens group 3, and a second motor driving circuit 19 performs drive control of the focus driving motor 22. A zoom driving motor 23 drives the zoom lens group 2, and a third motor driving circuit 20 performs drive control of the zoom driving motor 23. An operating switch 24 is a group of switches. A read-only memory (EEPROM) 25 is electrically rewritable and previously stores programs to perform various controls and data used for performing various operations. A battery 26 is used as a drive source of the whole imaging device 1. A switching circuit 27 controls flashing of a strobe flash unit 28. A display element 29 such as an LED displays warnings, and a speaker 30 gives instructions and warnings by sound. An AF assist light 33 is configured with a light source such as an LED serving as a lighting unit and lightens the entire or a portion of a subject when acquiring an AF evaluation value. An AF assist light driving circuit 32 drives the AF assist light 33. A shake detection sensor 35 which is an angular velocity sensor, a gyroscope or the like, detects shake such as hand shake, and a shake detection circuit 34 processes signals from the shake detection sensor 35. On receiving an output from the A/D converting circuit 7, a face detection circuit 36 detects the position and size of a face on the display.

For the storage memory 12, which is a storage medium of image data or the like, a fixed semiconductor memory, such as a flash memory, or a semiconductor memory having a form of a card or a stick, such as a card type flash memory, to be detachably connected to a device is used. Alternatively, various media such as magnetic storage media, for example, a hard disk or a floppy Disk™ can be used.

The operating switch 24 includes a main power switch for supplying power to start up the imaging device 1 or a release switch for starting shooting operation (storing operation). The operating switch 24 also includes a reproduction switch for starting a reproducing operation and a zoom switch for moving the zoom lens group 2 of the imaging optical system to zoom.

The release switch operates by two strokes which are a first stroke (hereinafter referred to as "SW1") and a second stroke (hereinafter referred to as "SW2"). In SW1, an instruction signal for starting the AE processing and AF processing which are performed before a shooting operation is produced. In SW2, an instruction signal for starting an actual exposure operation is produced.

The operation of the imaging device according to the embodiment thus configured will now be described below.

After the diaphragm 4 adjusting the light amount of light beam passing through the imaging lens sleeve 31 of the imaging device 1, the object light beam is focused on the light receiving surface of the imaging element 5. The focused subject image is converted into electric signals through the photoelectric conversion processing by the imaging element 5 to be output to the image pickup circuit 6. The image pickup circuit 6 performs various types of signal processing of the input signals to produce image signals. The image signals are output to the A/D converting circuit 7 to be converted into digital signals (image data) and then temporarily stored in the VRAM 8. The image data stored in the VRAM 8 are output to the D/A converting circuit 9 to be converted into analogue signals which are then converted into image signals having a form suitable to be displayed. The converted image signals are then displayed on the LCD 10 as an image. The image data stored in the VRAM 8 is also output to the compression/decompression circuit 11. After compressed by the compression circuit of the compression/decompression circuit 11, the image data is converted into image data having a form suitable for storage. The image data is then stored in the storage memory 12.

For example, when a reproduction switch (not shown) included in the operating switch 24 is set to the on-state, a reproducing operation starts. Then the compressed image data stored in the storage memory 12 is output to the compression/decompression circuit 11. The decompression circuit performs processing, such as decoding and decompressing, of the image data. The image data is then output to the VRAM 8 to be temporarily stored. The image data is output to the D/A converting circuit 9 to be converted into analogue signals and then into image signals having a form suitable to be displayed. The image data is then displayed on the LCD 10 as an image.

The image data digitized by the A/D converting circuit 7 is output not only to the VRAM 8 but also to the AE processing circuit 13, the scan AF processing circuit 14, and the face detection circuit 36. On receiving the input digital image signals, the AE processing circuit 13 performs computational processing, such as cumulative addition, of luminance values of image data amounting to one screen. The AE evaluation value corresponding to luminance of the subject is thus calculated. The AE evaluation value is output to the CPU 15.

On receiving the input digital image signals, the scan AF processing circuit 14 extracts high frequency components in image data through, for example, a high pass filter (HPF) and performs computational processing such as cumulative addition to calculate an AF evaluation value corresponding to a contour component amount in the high frequency side. Specifically, in the scan AF processing, high frequency components in the image data representing a portion of a screen selected as an AF area is extracted through, for example, a high pass filter (HPF) and computational processing such as cumulative addition is applied thereto. An AF evaluation value signal corresponding to the contour component amount in the high frequency side is thus calculated. The AF area or AF areas may be a central portion or any single portion of the display, a central portion or any single portion on the display and a plurality of adjoining portions, or a plurality of discretely distributed portions. As described above, in the AF processing, the AF processing circuit 14 functions as a high frequency component detecting unit for detecting high frequency components in image signals produced by the imaging element 5.

On receiving the input digital image signals, the face detection circuit 36 searches a feature of a face, such as eyes and brows, in the image to detect where the face of a person is located in the image. The face detection circuit 36 detects the size and tilt of the face from positional relationships of features such as a distance between features.

A timing signal is output from the TG 16 to the CPU 15, the image pickup circuit 6, and the sensor driver 17. The CPU 15 performs various types of control synchronizing with the timing signal. The image pickup circuit 6 performs various types of image processing, such as separation of color signals, synchronizing with the timing signal received from the TG 16. The sensor driver 17 drives the imaging element 5, synchronizing with the timing signal received from the TG 16.

The CPU 15 controls the first motor driving circuit 18, the second motor driving circuit 19, and the third motor driving circuit 20 to drive the diaphragm driving motor 21, the focus driving motor 22, and the zoom driving motor 23, respectively. The diaphragm 4, the focusing lens group 3, and the zoom lens group 2 are thereby driven and controlled. Specifically, the CPU 15 performs AE control to adjust the diaphragm 4 to provide a suitable stop amount by controlling the first motor driving circuit 18 based on, for example, the AE evaluation value calculated by the AE processing circuit 13 to drive the diaphragm driving motor 21. The CPU 15 also performs AF control to move the focusing lens group 3 to an in-focus position by controlling the second motor driving circuit 19 based on the AF evaluation value calculated by the scan AF processing circuit 14 to drive the focus driving motor 22. When a zoom switch (not shown) included in the operating switch 24 is operated, the CPU 15 controls the third motor driving circuit 20 to drive and control the zoom driving motor 23, thereby moving the zoom lens group 2 to perform zooming operation of the imaging optical system.

Figure 2:
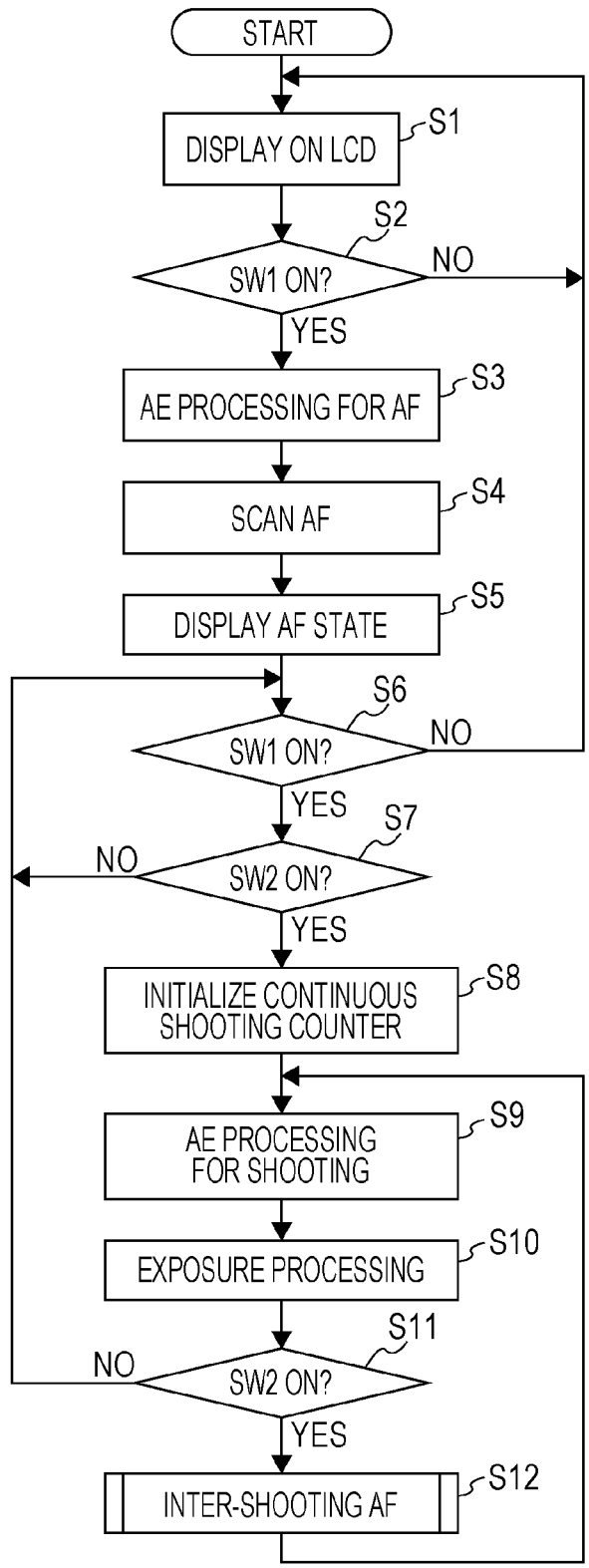
FIG. 2 is a flowchart illustrating a shooting operation of the imaging device according to the first embodiment.

The actual shooting operation of the imaging device according to the embodiment will now be described referring to the flowchart illustrated in FIG. 2. Hereinafter in the description on the embodiment, the operation of sequentially acquiring AF evaluation values while moving the focusing lens group 3 to each position will be referred to as "scanning", and the distance between positions of the focusing lens at which AF evaluation values are acquired is referred to as "scan interval". The number of AF evaluation values to be acquired is referred to as "the number of scan points", the area of an image in which AF evaluation values are acquired is referred to as "scan area", and the area of an image in which image signals for detecting an in-focus position is acquired is referred to as "AF frame".

When the main power switch of the imaging device 1 according to the embodiment is set to the on-state and the operating mode of the imaging device 1 is the shooting (recording) mode, a shooting processing sequence is performed.

In step S1, the CPU 15 displays the image that passes through the imaging lens sleeve 31 and is focused on the imaging element 5 on the LCD 10. In other words, the imaging element 5 performs photoelectric conversion processing to convert the subject image focused on the imaging element 5 into electric signals which is then output to the image pickup circuit 6. The image pickup circuit 6 performs various types of signal processing of the input signals to produce image signals which is then output to the A/D converting circuit 7. The image signals are converted into digital signals (image data) and temporarily stored in the VRAM 8. The image data stored in the VRAM 8 is output to the D/A converting circuit 9 to be converted into analogue signals and then into image signals having a form suitable to be displayed. The image signals are displayed on the LCD 10 as an image.

In step S2, the state of the release switch is checked. When the CPU 15 recognizes that SW1 (the first stroke of the release switch) has been set to the on-state by a photographer operating the release switch, the step proceeds to step S3. In step S3, the AE processing for AF is performed to set an exposure condition suitable for scan AF. For this purpose, a value of the diaphragm 4, an accumulation time of the imaging element 5, and a signal amplification factor of the image pickup circuit 6 are changed, as required, from the values in step S1 when display is on the LCD 10. The changes are made in parallel, not in sequence, to reduce the processing time.

Figure 3:
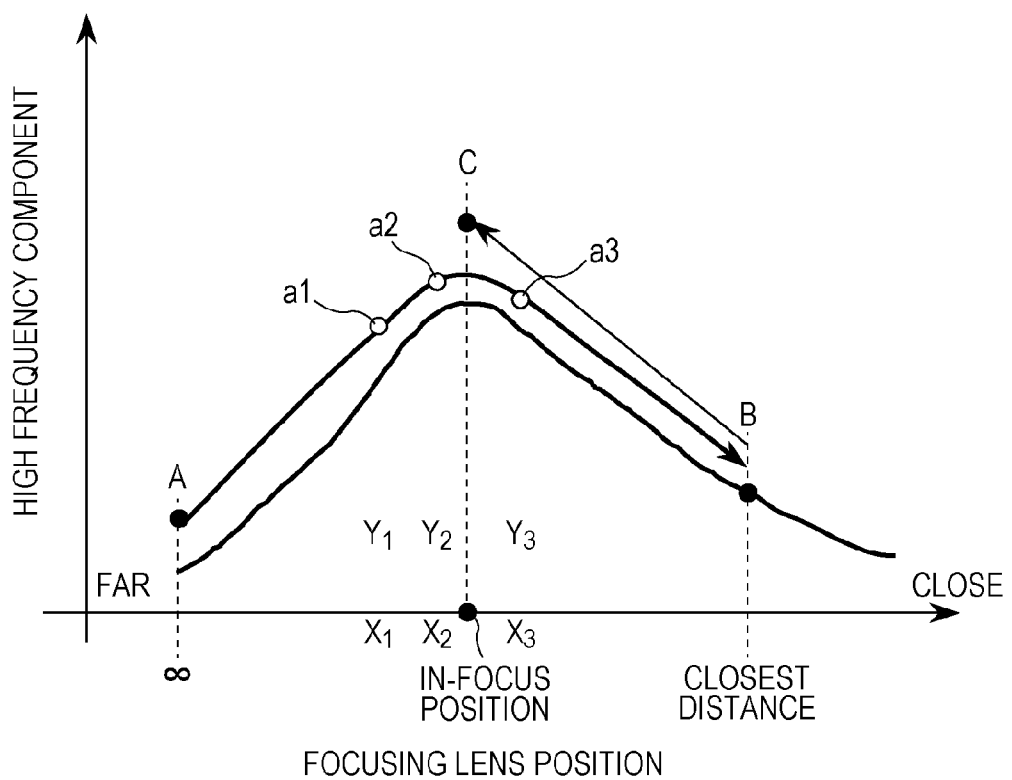
FIG. 3 is a graph illustrating a movement of a focusing lens position in scan AF.

Then in step S4, the scan AF processing is performed. That is, the CPU 15 performs the scan AF processing in step S4 to detect an in-focus position. The processing is schematically described using FIG. 3.

In the scan AF, the position of the focusing lens group 3 where the amount of high frequency components in the image signals produced by the imaging element 5 is the largest is obtained. The CPU 15 controls the focus driving motor 22 via the second motor driving circuit 19 that controls and drives the focus driving motor 22. The focusing lens group 3 is controlled to be driven from the position corresponding to the infinite distance (A in FIG. 3) to the position corresponding to the closest distance (B in FIG. 3) set for each shooting mode. The output from the scan AF processing circuit (AF evaluation value signal) is acquired while the focusing lens group 3 is driven. When the driving of the focusing lens group 3 is finished, the position where the acquired AF evaluation value signal is the maximum (C in FIG. 3) is searched and the focusing lens group 3 is driven to move to the searched position.

To increase the speed of the scan AF, the output from the AF processing circuit is acquired at positions located at the scan interval, not at every position where the focusing lens group 3 stops. The AF evaluation value signals may be acquired at positions a1, a2, and a3 in FIG. 3. In such a case, the in-focus position C is calculated based on the position where the AF evaluation value signal is the maximum and positions where the previous and the next acquisition of AF evaluation value signal is made.

When the AF evaluation value takes the maximum value of Y1 when the focusing lens group 3 is at position X1 (a2 in FIG. 3), and AF evaluation values of Y2 and Y3 are acquired at positions X2 and X3 (a1 and a3 in FIG. 3), respectively, just before and after the acquisition at position X1, the position X0 of the focusing lens group 3 corresponding to the in-focus position C is calculated by the equation expressed below.

$$X0=[(Y3-Y2)\cdot X1+(Y3-Y1)\cdot X2+(Y2-Y1)\cdot X3]/[2\cdot (Y3-Y1)],$$

where Y1>Y3 and Y1≥Y2

Before calculating the position where the AF evaluation value signal is the maximum (C in FIG. 3) by interpolation, reliability of the AF evaluation value signal is evaluated. If reliability is sufficiently high, the position where the AF evaluation value signal is the maximum is calculated and AFOK is displayed in step S5. This displaying is performed by lighting the display element 29 and by processing such as presenting a green frame on the LCD 10.

If the result of the evaluation in step S4 shows that reliability of the AF evaluation value signal is low, the position where the AF evaluation value signal is the maximum is not calculated, and the step proceeds to step S5 to display AFNG. This displaying is performed by blinking the display element 29 and by processing such as presenting a yellow frame on the LCD 10.

The method of evaluating reliability of the AF evaluation value signal in step S4 is disclosed in Japanese Patent No. 04235422 and Japanese Patent No. 04185741, so the description is omitted.

In step S6, the CPU 15 checks whether SW1 (the first stroke of the release switch) is kept at the on-state. If the on-state is kept, the step proceeds to the step S7.

In step S7, the state of SW2 (the second stroke of the release switch) is checked. If SW2 is at the on-state, the step proceeds to step S8. In step S8, the value of a continuous shooting counter, which counts the number of images taken during continuous shooting, is set to the initial value of 1, and the value of an AFNG counter, which counts the number of times that continuous focusing is determined to be impossible, is set to the initial value of 0. Then in step S9, the AE processing for shooting is performed to determine an exposure condition, and then in step S10, an actual main exposure operation and shooting processing accompanying a recording operation as well as the increment of the continuous shooting counter by one are performed. In the shooting operation, still image data is obtained through image processing of electrical signals output from the imaging element 5 and stored.

After finishing shooting processing, the step proceeds to step S11 to check SW2 (the second stroke of the release switch) again. If SW2 has been set to the off-state, the processing after setting SW1 to the on-state is finished and the step returns to step S6.

If the on-state of SW2 is maintained, the step proceeds to step S12 to perform processing related to AF between shootings (inter-shooting AF process).

After the inter-shooting AF process, the step returns to step S9 to perform AE processing, determine the exposure condition, and perform the actual exposure processing.

Naturally, the inter-shooting AF process is performed only during the period when a photographer is giving instruction to perform continuous shooting. When the instruction to perform continuous shooting is not given (for example, when a photographer selects the single shooting mode), the state of SW2 is checked in step S11 when AE processing and exposure processing in steps S9 and S10 are finished. If SW2 is still kept at the on-state, the procedure waits until SW2 is set to the off-state. That is, among step S9 to step S12, AE processing in step S9, exposure processing and counting up of continuous shooting counter in step S10, and inter-shooting AF process in step S12 are not performed, and only the state of SW2 is checked in step S11.

When SW2 is at the on-state in step S7, the procedure waits until SW2 is set to the on-state. If SW1 is set to the off-state during this waiting period, the step returns to step S1.

Figure 4:
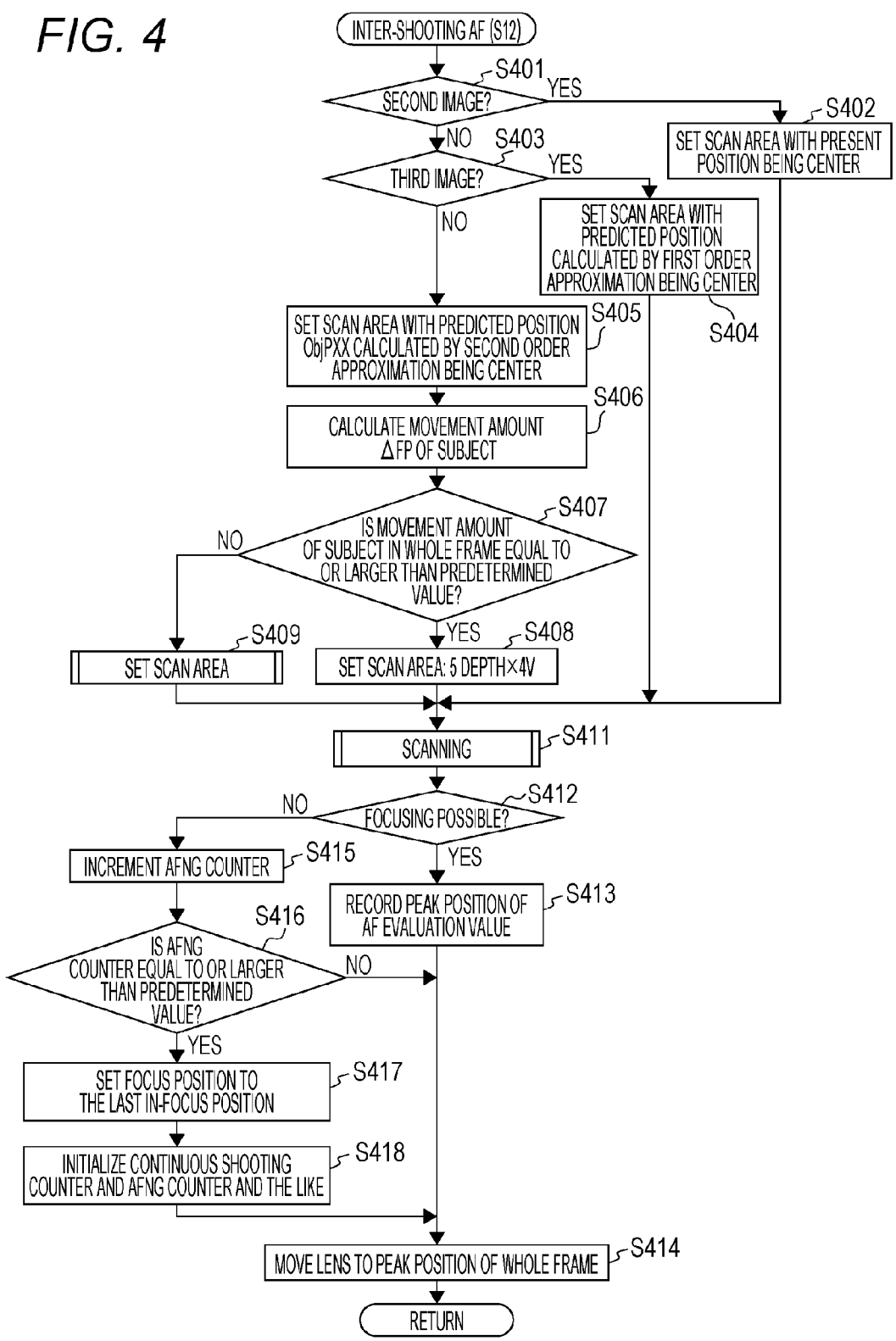
FIG. 4 is a flowchart explaining an operation of an inter-shooting AF process.

The inter-shooting AF process performed in step S12 is described in detail using FIG. 4. As mentioned above, if instruction to perform continuous shooting is not given, the inter-shooting AF process is not performed. So that, an operation where instruction is given to perform continuous shooting will now be described below.

This process is performed for the second image taken during continuous shooting. Thus the inter-shooting AF process is first performed for the second image taken during continuous shooting. So that at the start of the process, the value of the continuous shooting counter is 2.

In step S401, whether the image is the second image taken during the continuous shooting is checked. If the image is the second image taken during the continuous shooting (if the value of the continuous shooting counter is 2), the step proceeds to step S402, and if the image is not the second image, the step proceeds to step S403.

In step S402, the position of the focusing lens group 3 where the first image in continuous shooting is taken (peak point FP1) is set as a scan area center ObjP2. In the embodiment, the focusing lens group 3 does not move before taking the first image in the continuous shooting, so the scan area center ObjP2 is the current lens position. The scan area is set with priority placed on not extending the shooting interval in continuous shooting. Thus, the number of scan points are determined with consideration on time periods for processing performed during continuous shooting, for example, read-out of image signals from the imaging element or checking for the next shooting operation, so that the AF operation finishes within the time period between successive shootings. The scan area is set by setting a scan interval so as to allow the AF operation (searching for in-focus position) to be performed therein. The scan area (searching area) is calculated by multiplying "the number of scan points−1" by the scan interval. If the calculated scan area is broader than the whole area (the area from the closest distance end to the infinite distance end to be focused), the whole scan area is set as the scan area. If the set scan area extends further than the position corresponding to the closest distance end or the infinite distance end to be focused, the scan area is shifted so that the scan area does not extend further than the position corresponding to the closest distance end or the infinite distance end to be focused.

Factors including the peak point (relative maximum) FP1 and the scan area center ObjP2, which are used in the process, are all obtained from AF evaluation values acquired from output signals from the whole frame during scanning performed in step S411. After setting the scan area, the step proceeds to step S411.

In step S403, whether the image is the third image in continuous shooting (whether the value of the continuous shooting counter is 3) is checked. If the image is the third image in the continuous shooting, the step proceeds to step S404, and if the image is not the third image, the step proceeds to step S405.

If the image is the third image in the continuous shooting, already acquired history information on in-focus position includes information on two in-focus positions of the first and second images in the continuous shooting (peak points FP1 and FP2). In step S404, the subject position is predicted by first order approximation using information on the two in-focus positions assuming the time period between successive shootings being constant (the peak point for the third shooting is predicted), that is, the scan area center position ObjP3 is calculated by Equation (1) expressed below.

$$\mathrm{Obj}P3 = FP2 + (FP2 - FP1) \times FpAdj3 \qquad \text{Equation (1)}$$

In Equation (1), FpAdj3 is a parameter taking a value from 0 to 1 to determine weighting applied to the predicted subject position and the latest previous in-focus position. Based on the scan area center position ObjP3 calculated in this manner, the scan area shifted from the previous scan area to the moving direction of the subject is set. Similarly to step S402, priority is placed on not extending the shooting interval in continuous shooting when setting the scan area. Then the step proceeds to step S411.

In step S405 for shooting the fourth images onward, already acquired history information on in-focus position includes information on at least three in-focus positions. Thus the subject position is predicted by second order approximation assuming the time period between successive shootings being constant (the peak point for the current shooting is predicted). For example, the scan area center position ObjP4 for shooting the fourth image is calculated by Equation (2) expressed below. Based on the scan area center position ObjP4 calculated in this manner, the scan area shifted from the previous scan area to the moving direction of the subject is set.

$$\mathrm{Obj}P4 = (FP1 - 3FP2 + 3FP3) \times FpAdj4 + FP3(1 - FpAdj4) = (FP1 - 3FP2 + 2FP3) \times FpAdj4 + FP3 \qquad \text{Equation (2)}$$

In the next procedure, unlike the procedure described above, the scan area is not set.

In step S406, the absolute value of the difference between the in-focus position FP3 of the third image and the scan area center position for shooting the fourth image ObjP4 is calculated. The absolute difference is determined to be a movement amount of the subject along the optical axis.

In step S407, by comparing the movement amount of the subject along the optical axis calculated in step S406 with a predetermined value, whether the subject has traveled a considerable distance along the optical axis is determined. If the compared result shows that the subject has moved the predetermined value or more along the optical axis, the step proceeds to step S408 to set the scan area. As in a manner similar to step S402 and step S404, the priority is placed on not extending the shooting interval in the continuous shooting when setting the scan area. Then the step proceeds to step S411.

If the movement amount of the subject along the optical axis is smaller than the predetermined value, the step proceeds to step S409 to determine whether the subject is a still subject or a moving subject and to set a scan area. This processing is performed to set a scan area so as to capture a moving subject, avoiding false focusing by the main subject moving out of the scan area. However, when the scan area is set in such a manner for a still subject, the operating time unnecessarily increases.

For a moving subject, processing proceeds as described below. When the percentage of the background in the AF area capturing a subject is large, the focus might be set on the background when shooting the first image and the focus on the background may continue. Specifically, with a large percentage of the background in the AF area that captures the subject, the focus is set on the background when shooting the first image, and because the percentage of the background in the AF area capturing the subject is still large, the focus continues to be set on the background instead of the main subject. When the main subject moves and increases its percentage in the AF area to be larger than the background, the main object is out of the scan area which is set, for example, in step S404, so that the main object cannot be focused.

Thus the predetermined value for the comparison in step S407 is used to determine whether focus is set on the background after inter-shooting AF process. The predetermined value is used as a threshold to determine whether the subject is moving considering a detection error of an in-focus position or a predicted position.

Figure 6:
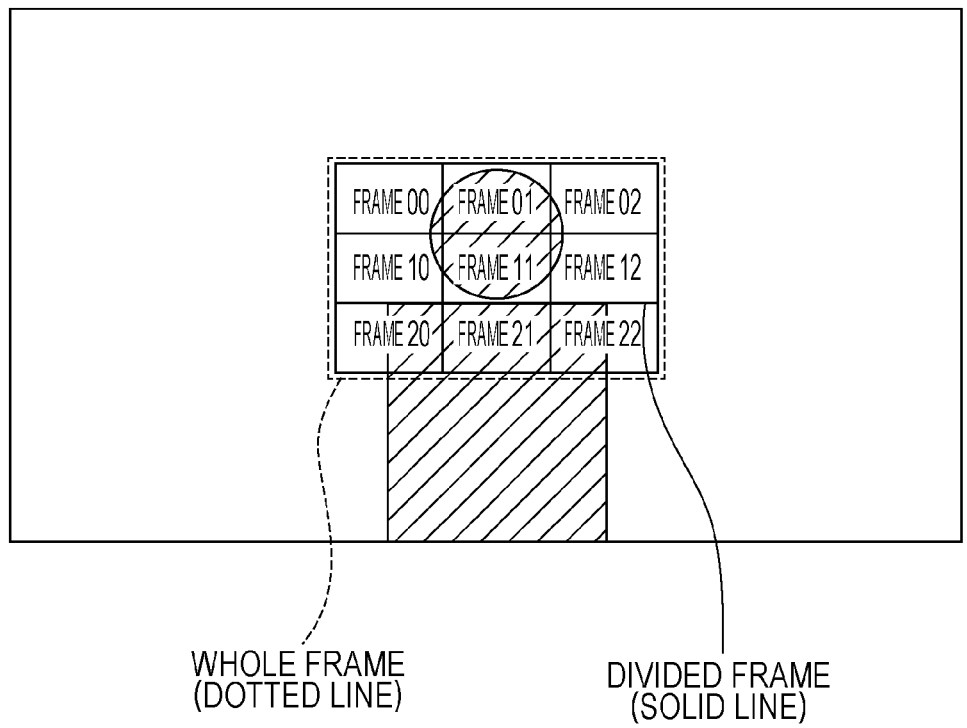
FIG. 6 is a figure illustrating an arrangement of AF frames.

The operation in step S409 will now be described using FIG. 8. FIG. 6 illustrates the arrangement of AF frames in a screen of the imaging element according to the embodiment. As illustrated in the drawing, the AF frame used for inter-shooting AF process (illustrated in a dotted line in FIG. 6) is divided in three both horizontally and vertically to form nine AF frames. An AF evaluation value is acquired for each frame, so that nine AF evaluation values can be acquired at each scan point. The nine AF evaluation values are added up into the AF evaluation value of the whole frame (illustrated in a dotted line in FIG. 6).

In the procedure from step S801, reliability of each divided frame is evaluated. The movement amount of subject in each reliable AF frame is evaluated to determine whether the subject being shot is moving or staying still. If the subject is determined to be a moving subject, the movement amount of the subject is predicted using information from divided frames.

In step S801, initialization processing is performed. The counter used in the following step is reset and the AF frame used in the following step of determination is initialized. When the AF frame is divided into nine as illustrated in FIG. 6, frame 00 is set as the AF frame.

In step S802, reliability of the scanning of the AF frame performed in the previous shooting is evaluated by a method disclosed in Japanese Patent No. 04235422 or Japanese Patent No. 04185741. If the scanning is determined to be unreliable, the step proceeds to step S807, and if the scanning is determined to be reliable, the step proceeds to step S803.

In step S803, the movement amount of subject in the AF frame which is being processed, $\Delta FPmn$, is calculated. Since step S803 is performed in the shooting of the fourth image onward, scanning has already been performed at least three times, so that information on at least three peak points has already been acquired for the AF frame being processed. Thus the subject position in the AF frame being processed is predicted by second order approximation assuming the time period between successive shootings being constant. For example, the predicted position of the subject for shooting the fourth image, ObjP4*mn*, is calculated by Equation (3) expressed below.

$$\text{Obj}P4mn = FP1mn - FP2mn + 3 \cdot FP3mn \qquad \text{Equation (3)}$$

In Equation (3), FP1*mn*, FP2*mn*, and FP3*mn* are peak points of the AF frame being processed which are obtained by scanning performed when shooting the first, second, and third images, respectively.

Then the absolute value of the difference between the peak point FP3*mn* of the AF frame being processed obtained by scanning performed when shooting the third image and the scan area center position ObjP4*mn* of the shooting of the fourth image is calculated. The resulting value is the movement amount of the subject along the optical axis in the AF frame being processed, which is, ΔFPmn.

If the movement value ΔFPmn obtained in the aforementioned processing is equal to or smaller than a predetermined amount (for example, a half the depth obtained from aperture value F during the scan AF in S411), the movement amount ΔFPmn is set to zero. This is because a slight movement amount may be erroneously detected for a still subject due to measurement errors caused by various reasons during the scan AF. When such erroneous detection occurs, a still subject may be determined to be a moving subject shifting back and forth of which next scan area is unpredictable. The processing is performed to avoid such problem.

In step S804, the obtained movement amount ΔFPmn is compared with a predetermined value. If ΔFPmn is equal to or larger than the predetermined value, the step proceeds to step S805 to count up the moving subject counter. If ΔFPmn is smaller than the predetermined value, the step proceeds to step S806 to count up the still subject counter.

The predetermined value used in this processing is smaller than the predetermined value used in step S407 in FIG. 4. The reason is as follows. The scan area for the second image onward is set by the peak point (in-focus position) of the AF evaluation value of the whole frame, so that when focus in the whole frame is shifted to the background of a moving subject, scan areas for divided frames may not cover the movement amount and the scanning performed for the second and third images may be insufficient. In such a case, a calculated movement amount of the subject may be smaller than an actual movement amount. Thus the predetermined value is determined to be a small value. For example, when the predetermined value in step S407 is five times the open depth, the predetermined value in this step is set to the half of the predetermined value in step S407, that is, two and a half times the open depth.

In step S807, whether processing for every divided AF frame is finished is checked. If the processing is not finished for every divided AF frame, the step proceeds to step S820 to select the AF frame to be processed. For example, when the processing of frame 00 is finished, frame 01 is selected, when the processing of frame 01 is finished, frame 02 is selected, and when the processing of frame 02 is finished, frame 10 is selected.

After the processing from step S802 to step S805 and step S806 is finished for every divided AF frame, the step proceeds from step S807 to step S808 to determine whether the subject being continuously shot is a still subject. This processing will now be described later.

If the subject is determined to be a still subject in step S808, the step proceeds to step S810. In step S810, a scan area is set under the condition that the peak point of AF evaluation value of the still subject is predictable and the movement of the subject is trackable. In this processing, weight is laid on the balance between shooting speed and focusing performance to set a scan area.

If the subject is determined to be a moving object in step S808, the step proceeds to step S811. In step S811, whether the peak point of AF evaluation value for the current shooting of the moving subject can be predicted from the information from divided frames is determined. This processing will be described later. If the peak point of AF evaluation value of the moving subject is determined to be predictable, the step proceeds from S811 to step S815 to predict the scan area center position by Equation (2). Then the step proceeds to step S810.

If the peak point of AF evaluation value of the moving subject is determined to be unpredictable, the step proceeds from S811 to step S813 to set a scan area of the moving subject. In this case, it is recognized that focus is set on the background and the subject is not tracked, so a larger weight is laid on focusing performance than the speed of continuous shooting. Thus, by considering factors, such as a focal length, a shooting distance, and an assumed moving speed of a subject, to surely set focus on the subject, the scan area is set to be larger than the scan area set in, for example, step S408 in FIG. 4.

Figure 5:
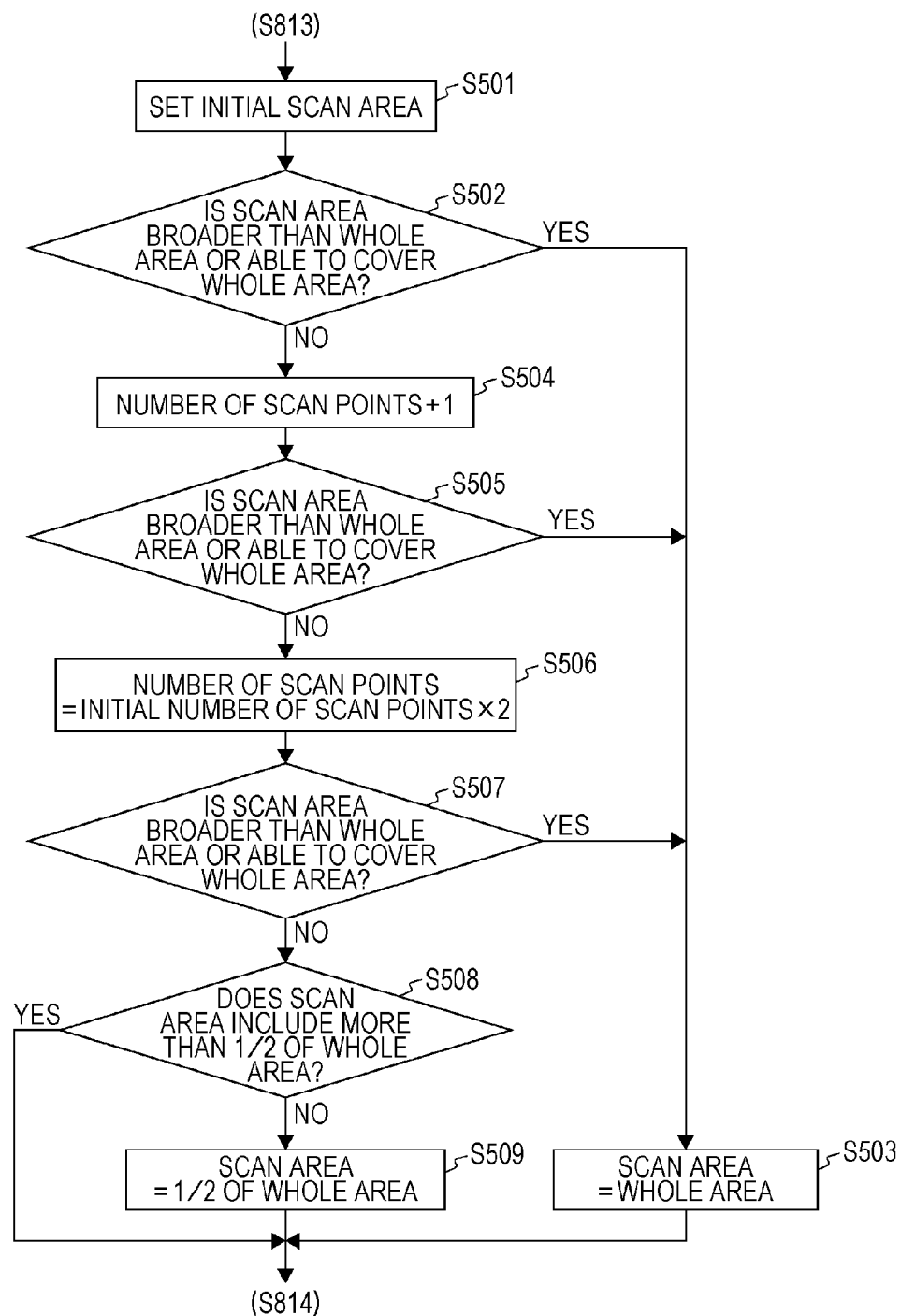
FIG. 5 is a flowchart explaining a method of determining a scan area.

Specifically, the scan area is set in a manner as described below. The procedure is illustrated in FIG. 5.

In step S501, an initial scan area is set. In a manner similar to step S408 in FIG. 4, the scan area is set by determining the number of scan points so as the AF operation finishes within the time period between successive shootings and setting the scan interval so as to allow the AF operation (searching of an in-focus position) to be performed therein. The scan area is calculated by multiplying "the number of scan points−1" by the scan interval. If the scan area set in this manner is broader than the whole area (the area from the closest distance end to the infinite distance end to be scanned), or if the whole area can be covered by shifting the scan area, the whole area is set as the scan area (step proceeds from step S502 to step S503).

If the set scan area cannot cover the whole area, the step proceeds to step S504 to increment the number of scan point by one without changing the scan interval. If the scan area calculated by multiplying "the number of scan points−1" by the scan interval is broader than the whole area (the area from the closest distance end to the infinite distance end to be scanned), the whole area is set as the scan area (step proceeds from step S505 to step S503). If the whole area can be covered by shifting the scan area, the whole area is set as the scan area (step proceeds from step S505 to step S503).

If the whole area cannot be covered even with the number of scan points incremented by one, the step proceeds to step S506 to double the number of scan points before incrementing by one (initial number of scan points) without changing the scan interval. If the scan area calculated by multiplying "the number of scan points−1" by the scan interval is broader than the whole area (the area from the closest distance end to the infinite distance end to be scanned), the whole area is set as the scan area (step proceeds from step S507 to step S503). If the whole area can be covered by shifting the scan area, the whole area is set as the scan area (step proceeds from step S507 to step S503).

If the scan area cannot cover the whole area, whether the scan area set in step S506 includes a half or more of the whole area is determined (step proceeds from step S507 to step S508). If it is determined in step S508 that the scan area includes a half or more of the whole area, the current scan area (double the initial scan area) is set as the scan area. If it is determined that the scan area set in step S506 includes less than a half of the whole area, a half of the whole area is set as the scan area (step S509).

After finishing the processing in step S509 as described above, the continuous shooting counter is initialized to 1 in step S814. With this initialization, if it is determined that an actually moving subject is not moving because focus is continuously set on the background, the current shooting is treated as the shooting of the first image even though the current shooting is not of the first image. Thus the next shooting is treated as the shooting of the second image, and the following shootings is treated in a similar manner.

After finishing the processing described above, the step proceeds to step S411. In step S411, scanning is performed according to the flowchart illustrated in FIG. 7 as described below. First, the AF evaluation value is acquired for each of the divided frames. The AF evaluation value of the whole frame is calculated. The AF evaluation values of the divided frames acquired at the same position of the focusing lens group 3 are added up into the AF evaluation value of the whole frame at the position of the focusing lens group 3. Then, the peak point of AF evaluation value of each frame and the peak point of AF evaluation value of the whole frame are obtained. If the frame is divided into nine as in FIG. 6, total ten peak points of AF evaluation value are obtained.

In step S412, reliability of the AF evaluation values are evaluated to determine whether focusing is possible.

If it is determined that focusing is possible, the step proceeds to step S413 to record the peak point of AF evaluation value.

When determining whether focusing is possible, reliability of the AF evaluation value of the whole frame is first determined by a method disclosed in Japanese Patent No. 04235422 or Japanese Patent No. 04185741. Then if reliability is determined to be high, it is determined that the focusing in the whole frame is possible.

If it is determined that focusing in the whole frame is impossible, whether focusing is possible in divided frames is determined. Reliability of divided AF frames is determined by a method disclosed in Japanese Patent No. 04235422 or Japanese Patent No. 04185741. If more than a predetermined number of frames (for example, six or more frames when divided frames are nine as illustrated in FIG. 6) have high reliability, the average value, the maximum value, and the minimum value of peak points of AF evaluation value of the divided frames having high reliability are calculated. If the maximum value and the minimum value are both within a range from the average value, it is determined that focusing is possible in the divided frames. The range may be, for example, from the average value minus the half the scan interval to the average value plus the half the scan interval.

If it is determined that focusing is possible in the whole frame, the peak point of the whole frame is recorded as the peak point of the AF evaluation value of the whole frame. If it is determined that focusing is impossible in the whole frame, the average value of peak points of AF evaluation value of the divided frames having high reliability is recorded as the peak point of the whole frame.

The step proceeds to step S414 to move the focusing lens group 3 to the peak point of the whole frame.

If it is determined that focusing is impossible in step S412, the step proceeds to step S415 to increment the value of the AFNG counter by one.

In step S416, whether the value of the AFNG counter is equal to or larger than a predetermined value (whether focusing is determined to be impossible a plurality of times consecutively) is determined. If the value of the AFNG counter is smaller than the predetermined value, the step proceeds to step S414 to move the focusing lens group 3 to the peak point of the whole frame.

The predetermined value may be, for example, around three.

If the value of the AFNG counter is equal to or larger than the predetermined value, the step proceeds to step S417 to move the focusing lens group 3 to the peak point recorded in step S413 (latest in-focus position among previous peak points).

In step S418, the value of the continuous shooting counter is set to the initial value of 1 and the value of the AFNG counter is set to the initial value of 0.

The step proceeds to step S414 to move the focusing lens group 3 to the latest previous in-focus position.

In the shooting of the second image onward, the focusing lens group 3 is not moved to a fixed point. This is because the subject is likely to be on a nearby image plane during continuous shooting, so that a better focused image is likely to be obtained by positioning the focusing lens to the previous in-focus position (position where the focusing lens has moved to before) than to the fixed point.

In a similar manner, in the continuous shooting when shooting the fifth image onward (when the value of the continuous shooting counter is 5 or larger), the subject position is predicted (the peak point for the current shooting is predicted) by second order approximation to calculate scan area center position ObjP(n) by Equation (4). Based on the center position ObjP(n) calculated in this manner, the scan area shifted from the previous scan area along the moving direction of the subject is set.

$$ObjP(n)=(FP(n-3)-3FP(n-2)+2FP(n-1))\times FpAdj(n)+FP(n-1) \quad \text{Equation (4)}$$

Similarly to the shooting of the fourth image, if the movement amount of the subject is equal to or smaller than a predetermined value, the step proceeds to step S409. Then following the procedure in FIG. 8, whether the subject is a still subject is determined, and based on this determination, a scan area is set.

Such processing may reduce the speed of continuous shooting (the number of images taken in a unit time), although in a case where focus is set on the background and cannot follow the moving subject, the processing can surely set focus on the main subject. In a case for a dead still subject or a subject moving by a small amount, the speed of continuous shooting (the number of images taken in a unit time) is not reduced if the subject can be followed by divided information.

Figure 7:
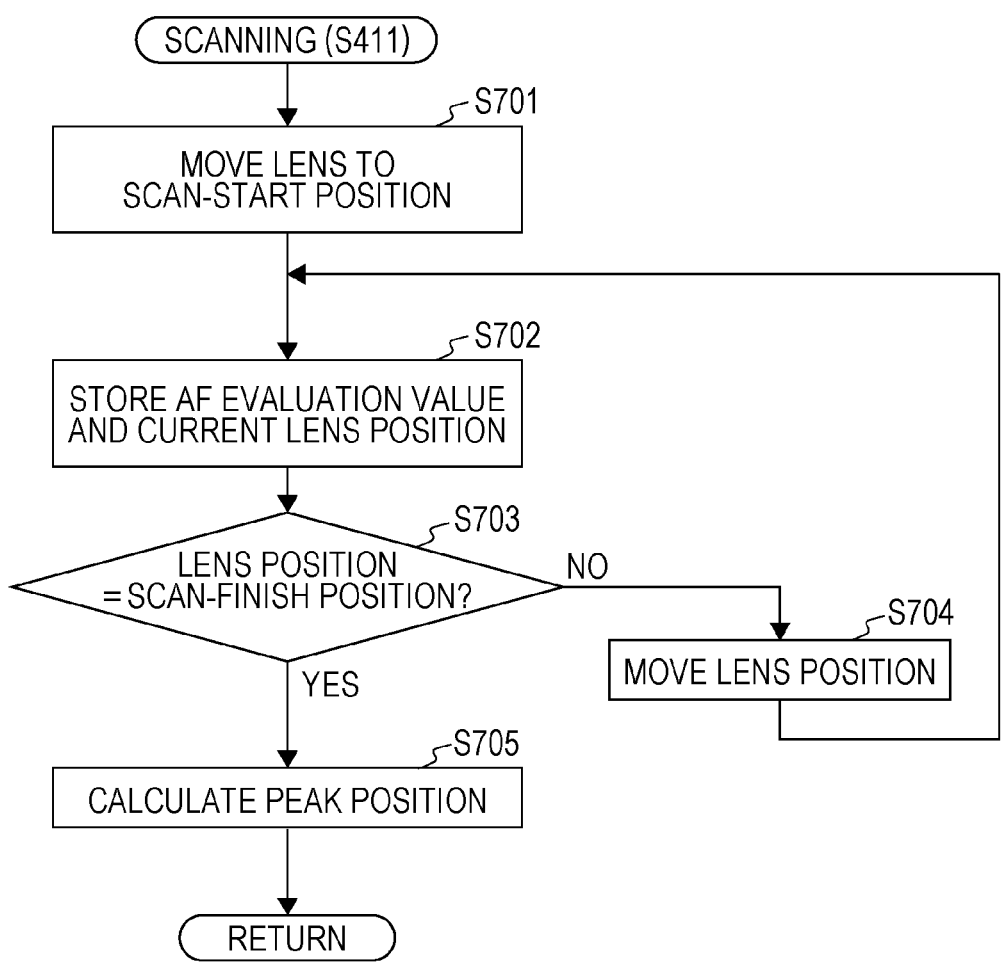
FIG. 7 is a flowchart explaining an operation procedure of scan AF.

The scan operation in the flowchart illustrated in FIG. 4 (step S411) will now be described referring to the flowchart illustrated in FIG. 7.

In step S701, the focusing lens group 3 is moved to a scan-start position (initial position) at a speed higher than the speed during scanning.

In the embodiment, the scan-start position is at an end of the set scan area. In step S702, AF evaluation values of areas corresponding to AF frames determined in the shooting area as illustrated in FIG. 6 are added up to calculate the AF evaluation value of the whole frame. The AF evaluation value of the whole frame and the AF evaluation values of each AF frame are associated with the position of the focusing lens group 3 and stored in a processing memory (not shown) embedded in the CPU 15. In step S703, whether the lens position is at a scan-finish position is checked. If the lens position is at the scan-finish position, the step proceeds to step S705, and if the lens position is not at the scan-finish position, the step proceeds to step S704. The scan-finish position is at the other end of the scan area. In step S704, the focusing lens group 3 is moved toward a direction by a certain amount. In step S705, the peak point of the focusing lens group 3 corresponding to the position where the AF evaluation value is the maximum is calculated from the AF evaluation value and the associated position of the focusing lens group 3 stored in step S702.

Figure 9:
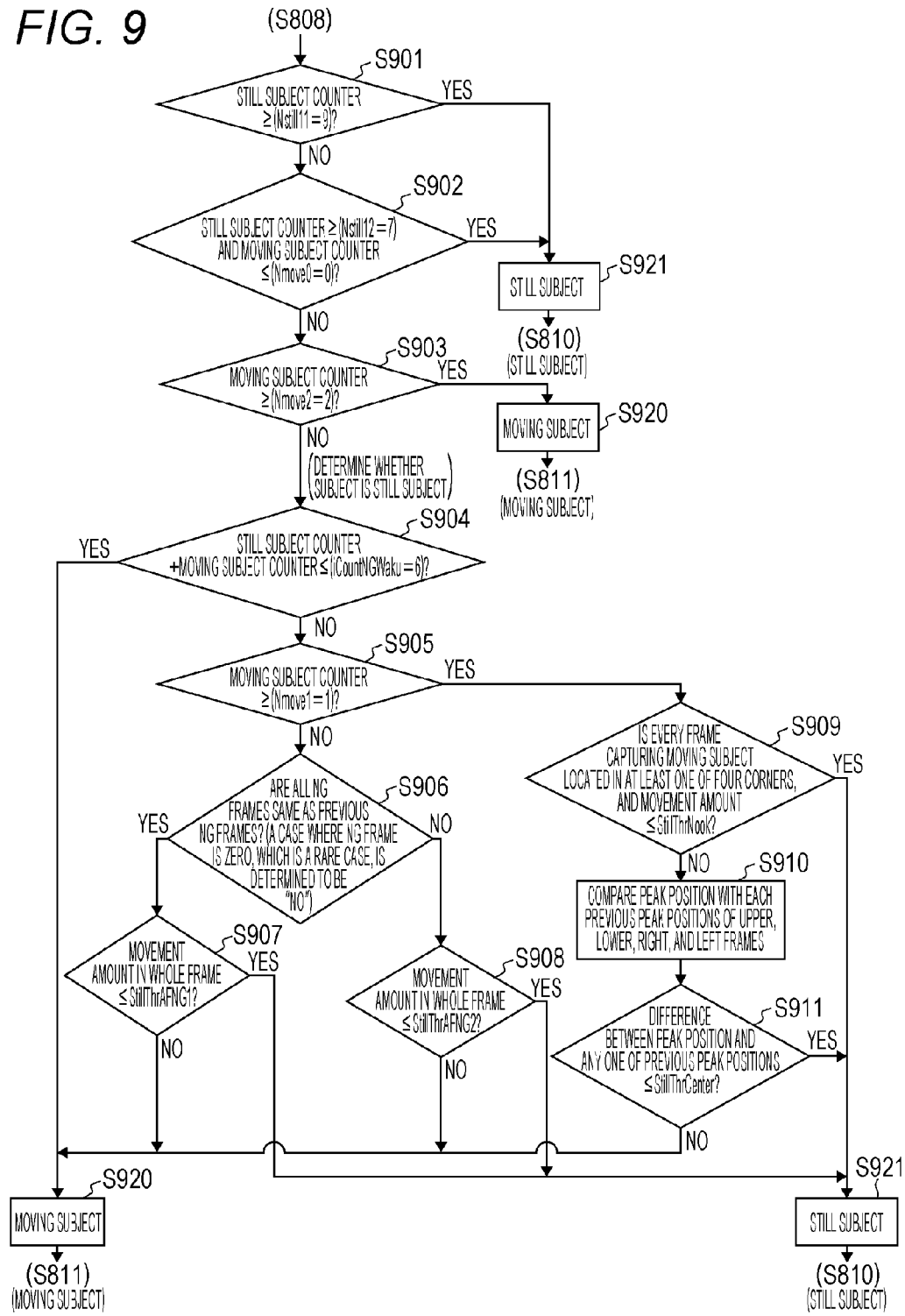
FIG. 9 is a flowchart explaining a method of determining whether a subject is a still subject or a moving subject.

An operation of determining whether the subject is a still subject performed in step S808 will now be described using FIG. 9. First, in steps S901 and S902, values of the moving subject counter and the still subject counter are checked.

Figure 8:
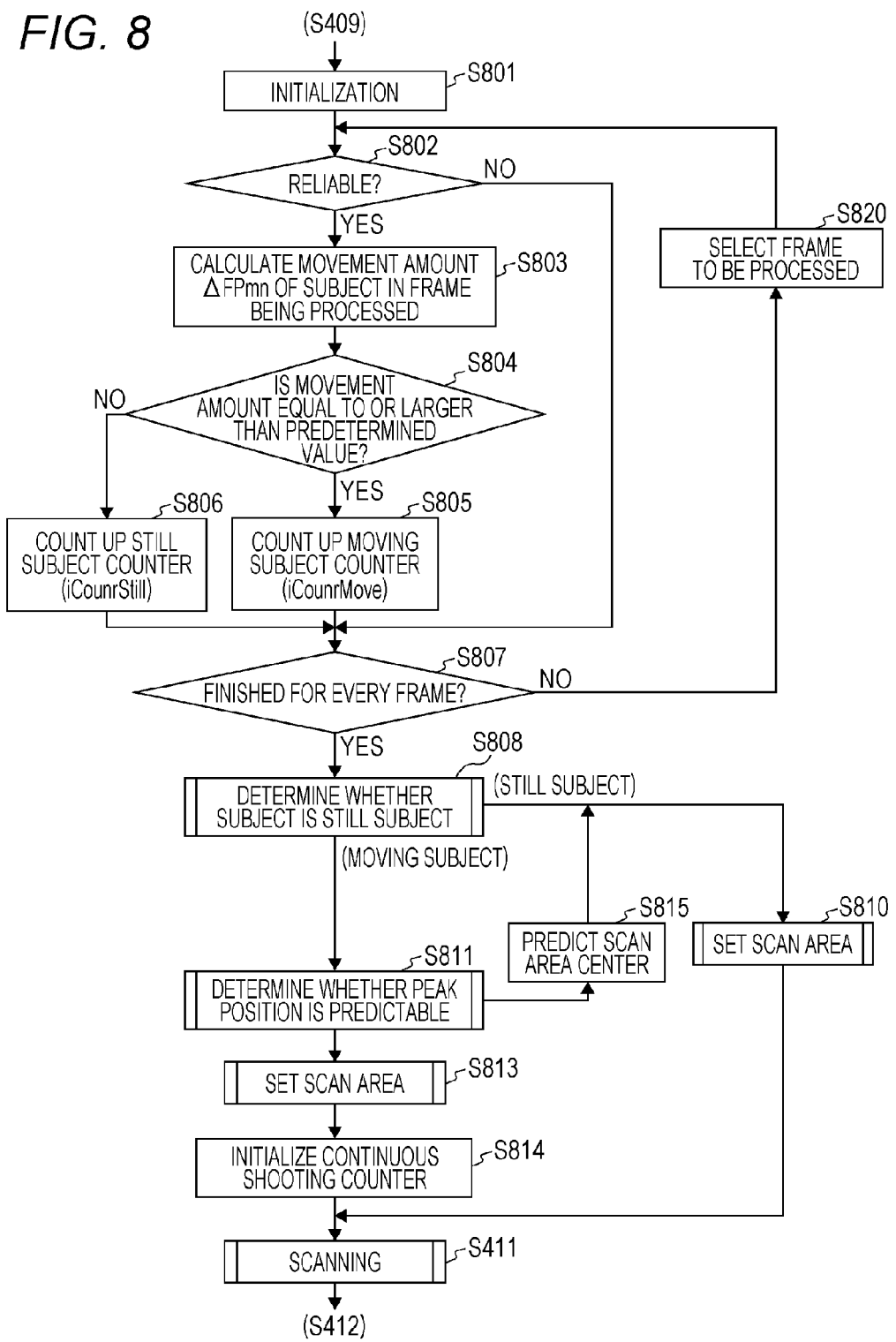
FIG. 8 is a flowchart explaining a method of setting a scan area.

If the value of the still subject counter counted in step S806 in FIG. 8 is equal to or larger than a first still subject determination value, the step proceeds to step S921 to determine the main subject to be a still subject.

In step S902, if the value of the still subject counter is equal to or larger than a second still subject determination value which is smaller than the first still subject determination value and the value of the moving subject counter is equal to or smaller than a first moving subject determination value, the step proceeds to step S921 to determine the main subject to be a still subject.

In step S903, the value of the moving subject counter is compared with a second moving subject determination value. If the value of the moving subject counter is equal to or larger than the second moving subject determination value, the step proceeds to step S920 to determine the main subject to be a moving subject.

With the effect from the background, even when the movement amount ΔFP of the subject obtained based on the in-focus position calculated from the AF evaluation value acquired from the whole AF frame is small, the subject may be a moving subject. The small movement amount ΔFP is caused by the background in the AF frame. For a moving subject, there exists among the divided AF frames an AF frame that receives no effect from the background and has a large movement amount ΔFP of the subject. So that if the value of the moving subject counter is equal to or larger than the second moving subject determination value, it is determined that a moving subject is being shot and the in-focus position of the whole AF frame is set on the background.

When the value of the still subject counter is equal to or smaller than the first still subject determination value, a moving subject may be shifting or moving out of the AF frame during scanning, though the value of the moving subject counter is small. When the value of the still subject counter is equal to or larger than the second still subject determination value, the subject being shot may be a moving subject and the in-focus position of the whole AF frame is set on the background. So that, only when the value of the moving subject counter is equal to or smaller than the first moving subject determination value and the value of the still subject counter is equal to or larger than the second still subject determination predetermined value, the subject is determined to be a still subject.

Then in step S904, whether the sum of the value of the still subject counter and the value of the moving subject counter is equal to or smaller than a predetermined number of AF frames that are determined to have AF evaluation values with no reliability is checked. Whether the subject is a still subject or a moving subject can be determined for the AF frame that has an AF evaluation value with reliability, but the determination cannot be made for the AF frame that is determined to be unreliable. Poor reliability may be caused by decrease in contrast of the subject by moving. So that if the sum of the value of the still subject counter and the value of the moving subject counter (corresponding to the number of AF frames determined to be reliable) is equal to or smaller than the predetermined number of AF frames that are determined to be unreliable, the step proceeds to step S920 to determine the main subject to be a moving subject.

In step S905, the value of the moving subject counter is compared with a third moving subject determination value. If the value of the moving subject counter is smaller than the third moving subject determination value, the step proceeds to step S906, if the value of the moving subject counter is equal to or larger than the third moving subject determination value, the step proceeds to step S909.

In step S906, whether the AF frame determined to be unreliable is the same AF frame from which the previous AF evaluation value is obtained. If the same AF frame is determined to be unreliable, the step proceeds to step S907 to compare the movement amount of subject in the whole frame in which the same AF frame is determined to be unreliable with a movement amount threshold for determining a subject to be a still subject. If the movement amount of subject in the whole frame is equal to or smaller than the movement amount threshold, the step proceeds to step S921 to determine the main subject to be a still subject. If the movement amount of subject in the whole frame is larger than the movement amount threshold, the step proceeds to step S920 to determine the main subject to be a moving subject.

In step S906, if a different AF frame is determined to be unreliable, the step proceeds to step S908. In step S908, the movement amount of subject in the whole frame in which a different AF frame is determined to be unreliable with the movement amount threshold for determining a subject to be a still subject. If the movement amount of subject in the whole frame is equal to or smaller than the movement amount threshold, the step proceeds to step S921 to determine the main subject to be a still subject. If the movement amount of subject in the whole frame is larger than the movement amount threshold, the step proceeds to step S920 to determine the main subject to be a moving subject.

Meanwhile, if the value of the moving subject counter is equal to or larger than the third moving subject determination value, the step proceeds from step S905 to step S909.

In step S909, whether all the AF frames determined to be frames capturing the moving subject are included in a group of AF frames located at four corners and whether the movement amount of subject in each of the AF frames is equal to or smaller than the predetermined value are determined. For example, when nine AF frames are provided as illustrated in FIG. 6, whether all the AF frames determined to be frames capturing the moving subject are included in a group of frame 00, frame 02, frame 20, and frame 22 and whether the movement amount of subject in each of the AF frames is equal to or smaller than the predetermined value are determined. If the condition is satisfied, the step proceeds to step S921 to determine the main subject to be a still subject.

If any of the AF frames determined to be frames capturing the moving subject is not included in the group of AF frames located at four corners, the step proceeds to step S910. In step S910, the peak point of AF evaluation value of the AF frame determined to be a frame determined to be a frame capturing the moving subject is compared with the peak point of previously acquired AF evaluation value of each of AF frames located in the upper, lower, right, and left sides of the AF frame determined to be a frame capturing a moving subject. For example, if nine AF frames are provided as illustrated in FIG. 6 and frame 11 is determined to be a frame capturing the subject, the processing is performed as follows: the peak point of AF evaluation value of frame 11 is compared with the peak point of each of the previously acquired AF evaluation values of frame 01, frame 10, frame 12, and frame 21. Then the difference between compared values is calculated for each comparison.

If any of the calculated peak point differences is equal to or smaller than the peak point difference of AF evaluation value for determining a subject to be a still subject, the step proceeds from step S911 to step S921 to determine the main subject to be a still subject.

If any of the calculated peak point differences is larger than the peak point difference of AF evaluation value for determining a subject to be a still subject, the step proceeds from step S911 to step S920 to determine the main subject to be a moving subject.

For AF frames divided into 3×3, that is nine frames, the first still subject determination value is around 8, the second still subject determination value is around 7, the first moving subject determination value is around 0, and the second moving subject determination value is around 2. For determination in step S904, the determination value for the sum of the value of the still subject counter and the moving subject counter is around 6, and the determination value for the value of the moving subject counter is around 1. The movement amount threshold for determining a subject to be a still subject applied to a movement amount of subject in the whole frame when the same AF frame is determined to be unreliable is around 4 times the depth, and the movement amount threshold for determining a subject to be a still subject applied to a movement amount of subject in the whole frame when different AF frame is determined to be unreliable is around 3 times the depth. The movement amount for determining a subject to be a still subject in S909 may be around 4 times the depth, and the peak point difference of AF evaluation value for determining a subject to be a still subject in S911 may be around 3 times the depth.

Figure 10A:
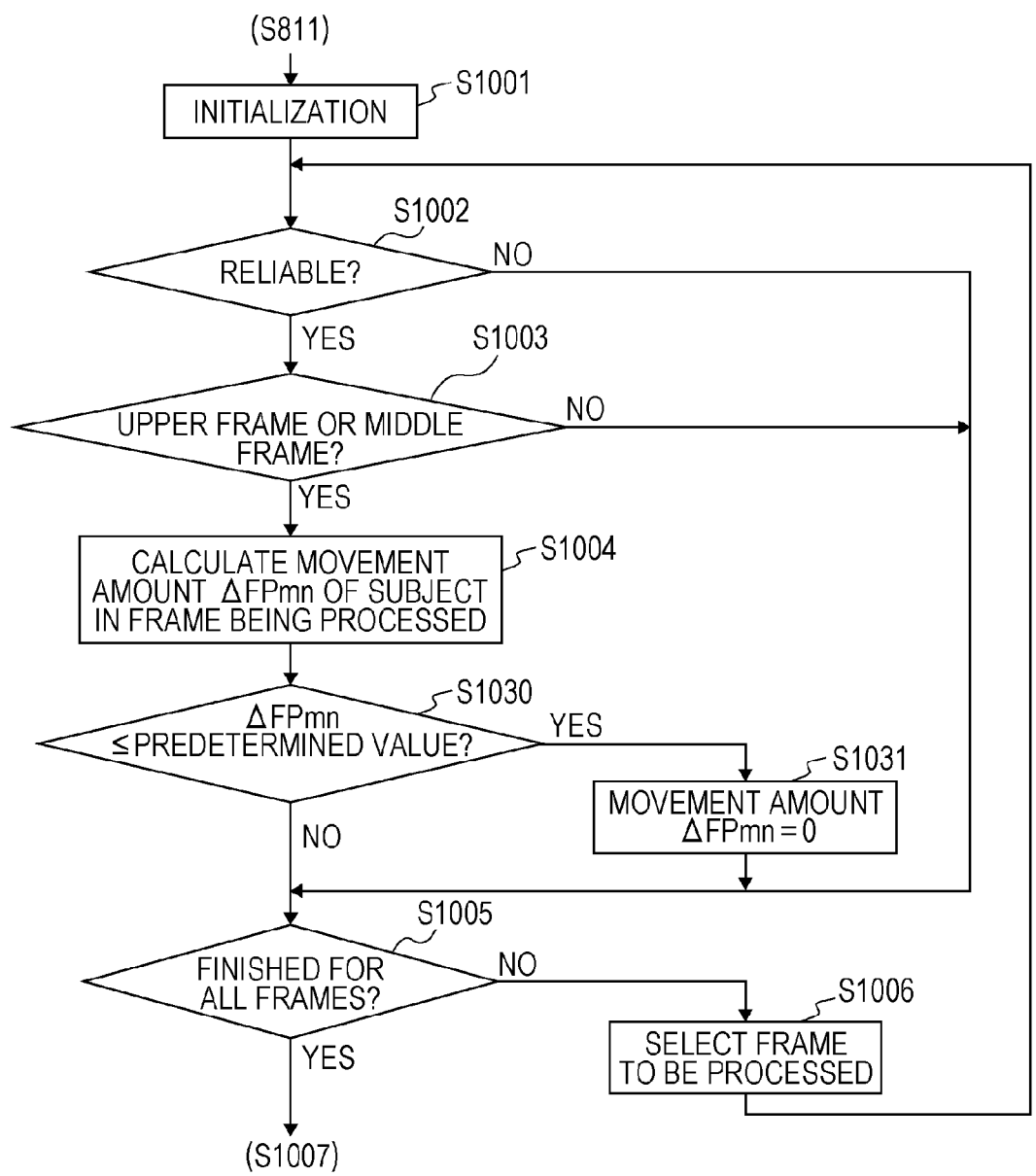
FIG. 10A is a flowchart explaining a method of determination and prediction of a peak point.
Figure 10B:
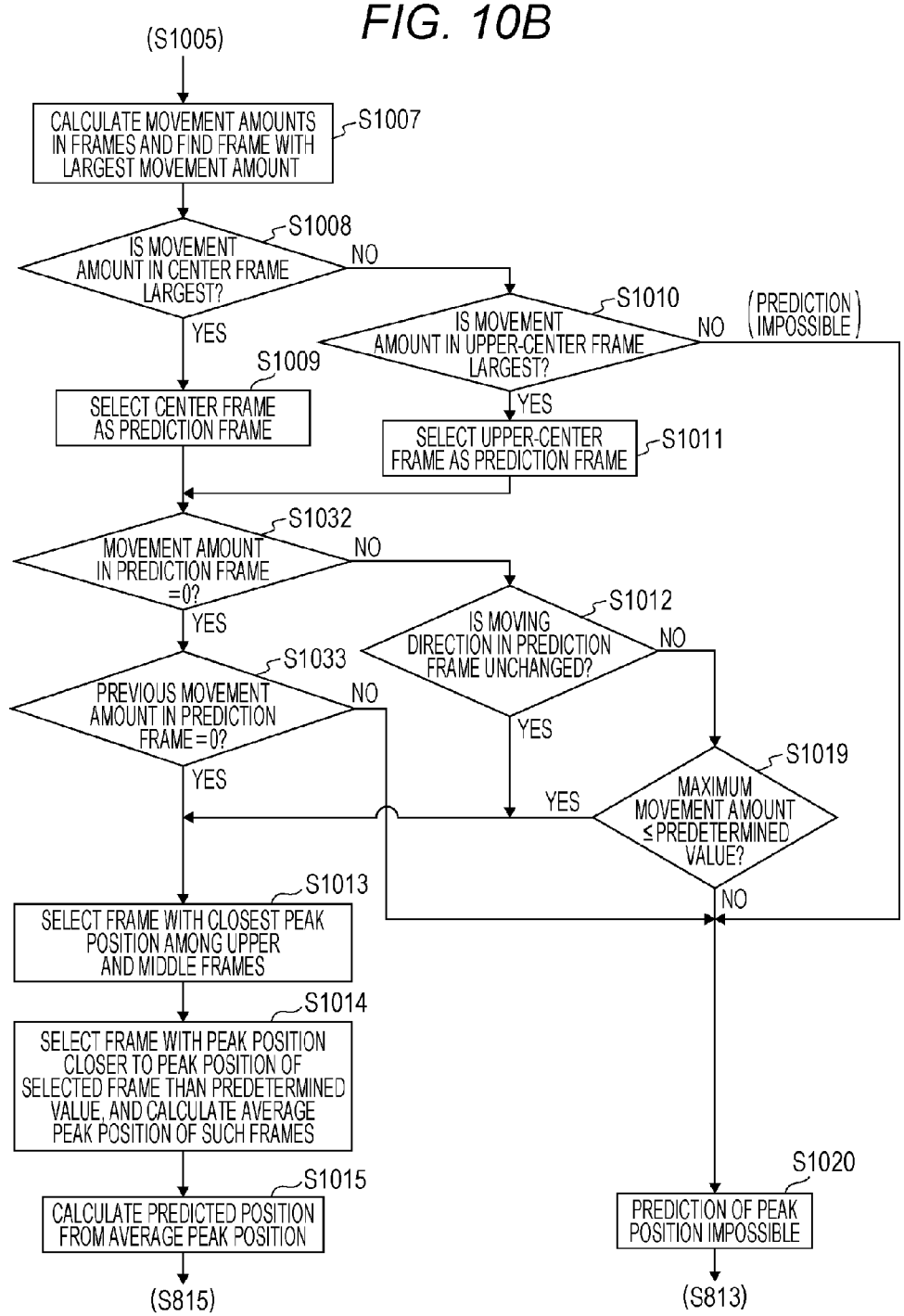
FIG. 10B is a flowchart explaining a method of determination and prediction of a peak point.

The determination and prediction of a peak point performed in step S811 will be described using FIGS. 10A and 10B.

In step S1001, initialization processing is performed. The counter used in the following step is reset and the AF frame used in the following step for determination is initialized. When the AF frame is divided into nine as illustrated in FIG. 6, frame 00" is set as the AF frame.

In step S1002, reliability of scanning of the AF frame performed in the previous shooting is evaluated by a method disclosed in Japanese Patent No. 04235422 or Japanese Patent No. 04185741. If the scanning is determined to be unreliable, the step proceeds to step S1005, and if the scanning is determined to be reliable, the step proceeds to step S1003.

In step S1003, whether the AF frame being processed is an upper frame or a middle frame is determined. For example, for frame divided into nine AF frames as illustrated in FIG. 6 with the camera in a normal position, frame 00, frame 01, and frame 02 are upper frames and frame 10, frame 11, and frame 12 are middle frames.

If the AF frame being processed is an upper frame or a middle frame, the step proceeds to step S1004 to calculate the movement amount ΔFPmn of the subject in the AF frame being processed. The calculating method is similar to that in step S405 and S406 in FIG. 4.

In step S1030, whether the movement amount ΔFPmn obtained in step S1004 is equal to or smaller than a predetermined value is checked. If the movement amount ΔFPmn is equal to or smaller than the predetermined value, the step proceeds to step S1031 to determine the movement amount ΔFPmn to be zero. In this manner, erroneously determining a still subject to be a moving subject, of which scan area for the next shooting cannot be predicted, due to, for example, a measurement error in scan AF can be avoided.

If the movement amount ΔFPmn obtained in step S1004 is larger than the predetermined value, the step proceeds to step S1005. If the AF frame being processed is not an upper frame or a middle frame, the step proceeds to step S1005. In step S1005, whether the processing is finished for all the divided AF frames is checked. If the processing is not finished for all the divided AF frames, the step proceeds to step S1006 to select an AF frame to be processed. For example, when processing of frame 00 is finished, frame 01 is selected, when processing of frame 01 is finished, frame 02 is selected, and when processing of frame 02 is finished, frame 10 is selected as an AF frame to be processed.

When processing is finished for all the divided AF frames, the step proceeds to step S1007 to select the AF frame with the largest movement amount of subject calculated in step S1004 and calculate the movement amount of subject in the selected AF frame. If the calculated movement amounts are all zero, the largest movement amount is zero.

If the movement amount of the center frame (frame in the example frames illustrated in FIG. 6) is the largest, the step proceeds from step S1008 to step S1009 to set the center frame as the AF frame to be used for prediction. If the movement amount of the upper-center frame (frame 01 in the example frames illustrated in FIG. 6) is the largest, the step proceeds from step S1010 to step S1011 to set the upper-center frame as the AF frames to be used for prediction. If the movement amount of the AF frame other than the center frame and the upper-center frame is the largest, the step proceeds from step S1010 to step S1020 to determine that prediction of peak point is impossible. Then the procedure from step S813 in FIG. 8 is performed.

In step S1032, whether the movement amount of the frame determined to be a prediction frame (the center frame or the upper-center frame) is zero is checked. If the movement amount is not zero, the step proceeds to step S1012. If the movement amount is zero, the step proceeds to step S1033 to check whether the previous movement amount of subject in the frame determined to be the prediction frame (the center frame or the upper-center frame) is zero. If the previous movement amount is not zero, step proceeds to step S1020 to determine that the prediction of peak point is impossible. If the movement amount is zero, the step proceeds to step S1013.

In step S1012, whether the moving direction of a subject in the AF frame determined to be the prediction frame is unchanged is determined. Determination is made by inequalities expressed below where PN, PN−1, and PN−2 are peak points of the current, the previous, and before the previous AF evaluation values, respectively, of the AF frame determined to be the prediction frame, and "||" indicates the absolute value. ΔP is a predetermined value related to the movement amount of subject and desirably takes a value of two to three times the depth.

$$|(PN-2)-(PN-1)|>\Delta P$$

$$|(PN-1)-PN|>\Delta P$$

If the above inequalities are satisfied and (PN−2)−(PN−1) and (PN−1)−PN take the same plus or minus sign, the moving direction of a subject in the AF frame determined to be the prediction frame is determined to be unchanged, and the step proceeds from step S1012 to step S1013.

If the moving direction has changed, the step proceeds to step S1019. In step S1019, the largest movement amount is compared with a predetermined value (for example, a value identical to a depth). If the largest movement amount is equal to or smaller than the predetermined value, the step proceeds to step S1013. If the largest movement amount is larger than the predetermined value, the step proceeds to step S1020 to determine that prediction of peak point is impossible.

If prediction of peak point is determined to be possible, the step proceeds to step S1013 to select a frame among divided AF upper and middle frames (frame 00 to frame 12 in the example frames illustrated in FIG. 6) that has a closest peak point of AF evaluation value. Then in step S1014, a difference between the peak point of the selected AF frame and the peak point of other AF frame is calculated to select the AF frame that has the difference equal to or smaller than a predetermined value (for example, within one depth). The differences of peak point of the selected AF frames are averaged to obtain an average value FP(n).

In step S1015, the predicted position ObjP(n+1), which is the center of the scan AF in the next shooting, is calculated by Equation (5).

$$\text{Obj}P(n+1)=(FP(n-2)-3FP(n-1)+2FP(n))\times \text{FpAdj}4+FP(n) \quad \text{Equation (5)}$$

In Equation (5), the peak point of AF evaluation value acquired by scanning performed in S411 for the AF frame selected in step S1013 is used for FP(n−2) and FP(n−1).

Setting of a scan area performed in step S810 in FIG. 8 will now be described. This processing is performed when a subject is a still subject or a peak point of AF evaluation value can be predicted to track the movement of a subject. Thus, weight is placed on the balance between the speed of continuous shooting and focusing performance when setting a scan area.

If the subject is determined to be a still subject, a scan area is set in a manner similar to that in steps S402, S404, and S408, that is, placing priority on not extending the shooting interval in continuous shooting. For example, when shooting the fourth image of a still subject, a scan area is set to have in the center a predicted position ObjP4 of the subject calculated in step S405 to shoot the fourth image, placing priority on not extending the shooting interval in continuous shooting.

If the subject is determined to be a moving subject, whether sufficiently effective tracking is possible is determined from certainty of determination and prediction of the peak point for the subject. If the tracking of the subject may not be sufficiently effective, the scan area is broadened.

When a peak point of AF evaluation value can be predicted and a movement of the subject can be tracked with sufficient effectiveness, the scan area is set to have in the center the predicted position ObjP4 of the subject calculated using Equation (2) in step S815 to shoot the fourth image. The scan area is set with priority placed on not extending the shooting interval in continuous shooting.

If the subject may not be tracked with sufficient effectiveness, the scan area is set to have in the center the predicted position ObjP4 of the subject calculated using Equation (2) in step S815 to shoot the fourth image. Different from when the subject is tracked with sufficient effectiveness, the number of scan points is incremented by a several number to secure the focusing performance of the scan area.

The certainty of determination and prediction of peak point for the subject is determined based on the following condition. The determination is made according to, for example, "the value of the still subject counter and the value of the moving subject counter acquired in step S805 in FIG. 8" and "the location of the frame determined to be the prediction frame in step S1009 in FIG. 10B". Alternatively, the determination is made according to, for example, "the difference between the position of the focusing lens group 3 where the AF evaluation value of the AF frame used for prediction takes a peak value and the peak position of each of other AF frames, calculated in step S1014 in FIG. 10B". Alternatively, the determination is made according to, for example, "the maximum value of ΔFPmn, variation in ΔFPmn, and variation in whole movement amount that are obtained in step S803 in FIG. 8".

Figure 12:
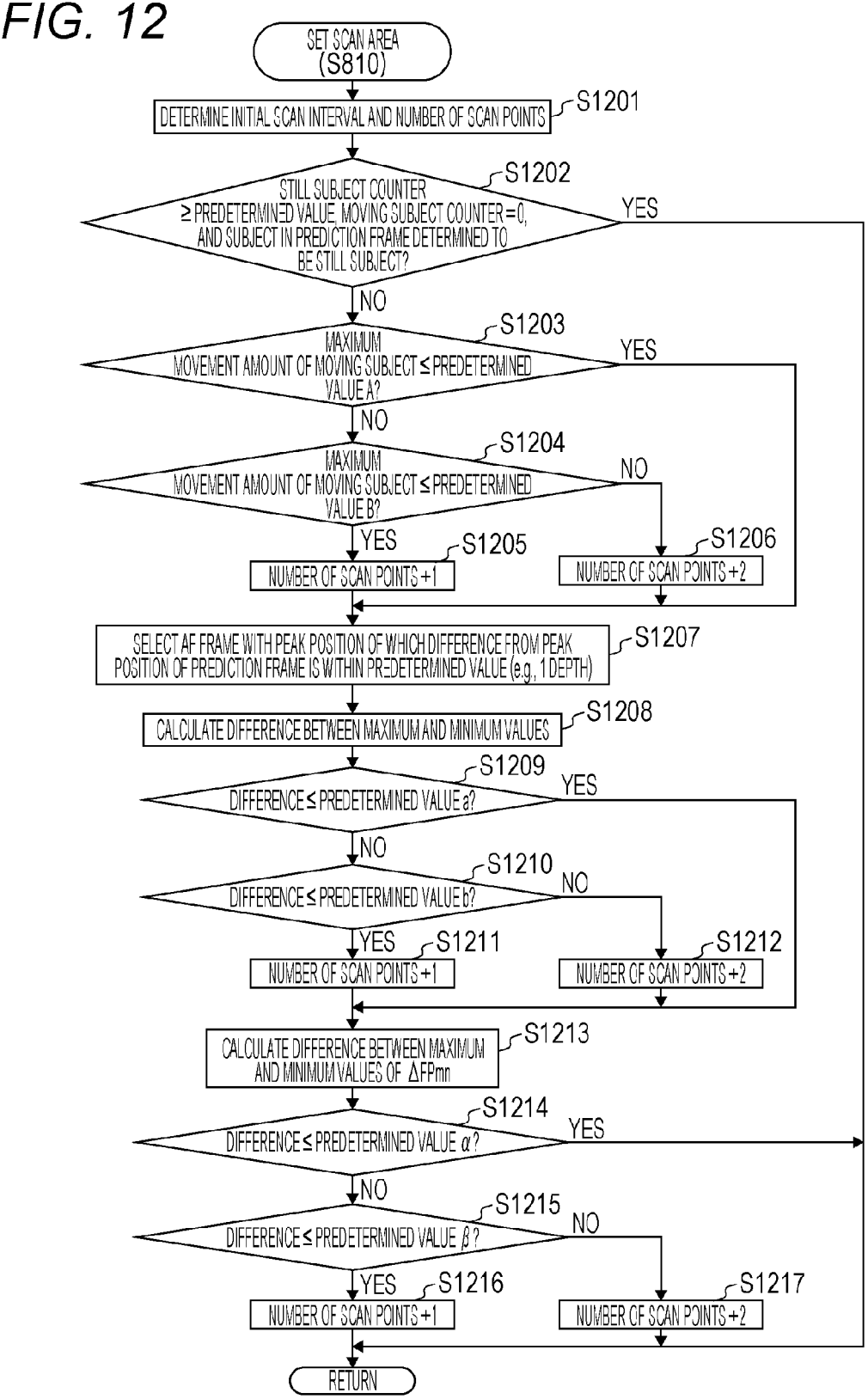
FIG. 12 is a flowchart explaining a method of setting a scan area in the first embodiment.
Figure 13A:
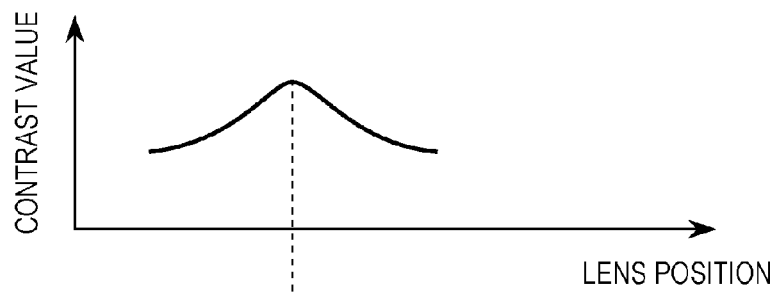
FIG. 13A is a chart illustrating an in-focus position in a shooting before the previous shooting.
Figure 13B:
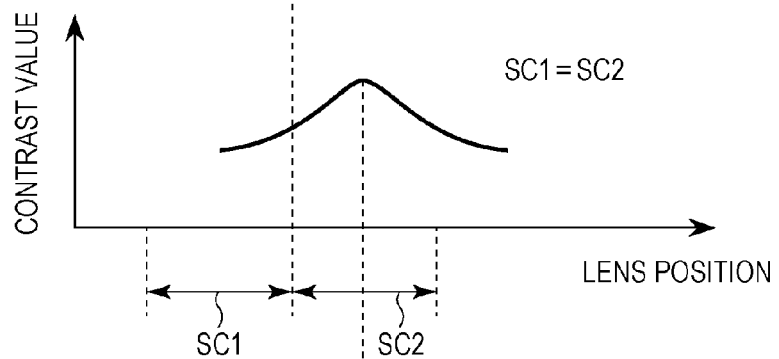
FIG. 13B is a chart illustrating an in-focus position in the previous shooting.
Figure 13C:
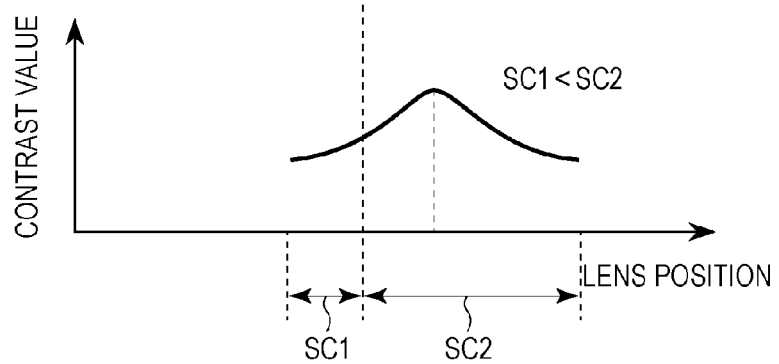
FIG. 13C is a chart illustrating distributed scan areas for a lens determined based on the in-focus position in the previous shooting and the in-focus position in the shooting before the previous shooting.

Specific determination and a method of setting a scan area will now be described using FIG. 12.

In step S1201, the number of scan points and the scan interval are set to initial values. In a manner same as in steps S402, S404, and S408, priority is placed on not extending the shooting interval in continuous shooting when setting a scan area and the number of scan points is determined so as the AF operation finishes within a time period between successive shootings. The scan area is set by setting a scan interval so as to allow the AF operation (searching of an in-focus position) to be performed therein. The scan area is calculated by multiplying "the number of scan points−1" by the scan interval. If the set scan area is broader than the whole area (the area from the closest distance end to the infinite distance end to be focused), the whole area is set as the scan area. If the set scan area extends further than the position corresponding to the closest distance end or the infinite distance end to be focused, the scan area is shifted so that the scan area does not extend further than the position corresponding to the closest distance end or the infinite distance end to be focused.

In step S1202, in a case described below, the step deviates from the procedure starting from step S1203 and the number of scan points and the scan interval stay same as the initial values. Such is the case where the value of the still subject counter acquired in step S806 is equal to or larger than a predetermined value, when the value of the moving subject counter acquired in step S806 is zero, and when the subject in the prediction frame determined in step S1009 or step S1011 is determined to be a still subject. In an example case of the value of the still subject counter acquired in step S806 being equal to or larger than the predetermined value, the value of the still subject counter is 6 or larger where nine AF frames are provided as illustrated in FIG. 6.

In this case, although the subject is not determined to be a still subject, the probability of the subject being a still subject is very high, so that it is determined that the peak point of AF evaluation value can be predicted. Therefore, the subject can be tracked with sufficient effectiveness using the initial number of scan points and the initial scan interval.

If the above condition is not satisfied, the step proceeds to step S1203 to start processing related to determination using the movement amount of subject determined to be a moving subject (ΔFPmn obtained in step S803) and setting of a scan area.

In step S1203, the maximum value of movement amount of subject in AF frames determined to be a frame capturing a moving subject is obtained, and whether the maximum value is equal to or smaller than predetermined value A is checked. If the maximum value is equal to or smaller than the predetermined value A, the step proceeds to step S1207. This processing is not performed for the AF frame determined to be unreliable in step S802.

If the maximum value is larger than the predetermined value A, the step proceeds to step S1204 to determine whether the maximum value is equal to or smaller than predetermined value B which is larger than the predetermined value A. If the maximum value is equal to or smaller than the predetermined value B, the step proceeds to step S1205 to increment the number of scan points by one. If the maximum value is larger than the predetermined value B, the step proceeds to step S1206 to increment the number of scan points by two. When the movement amount is large, the subject may be tracked with insufficient effectiveness, so that a scan area is broadened according to the movement amount.

Then the processing related to determination using positions of the focusing lens group 3 where AF evaluation values of the prediction AF frame and other AF frames takes peak values and setting of a scan area starts.

In step S1207, positions of the focusing lens group 3 where AF evaluation values of the frame determined to be the prediction frame and of other AF frames acquired in scanning in step S411 are obtained. For AF frames other than the prediction AF frame, the difference of the position of the focusing lens group 3 taking a peak value between the AF frame and the prediction AF frame is calculated. Calculated differences within a predetermined value (for example, 1 depth of open F-number) are selected and the difference between the maximum value and the minimum value of the selected differences is calculated. The maximum value and the minimum value are evaluated by values with plus or minus sign, not by absolute values. This processing is not performed for the AF frame determined to be unreliable in step S802.

In step S1209, the difference is compared with predetermined value a. If the difference is equal to or smaller than the predetermined value a, the step proceeds to step S1213. If the difference is larger than the predetermined value a, the step proceeds to step S1210 to check whether the difference is equal to or smaller than predetermined value b which is larger than the predetermined value a. If the difference is equal to or smaller than the predetermined value b, the step proceeds to step S1211 to increment the number of scan points by one. If the difference is larger than the predetermined value b, the step proceeds to step S1212 to increment the number of scan points by two. If the position where the AF evaluation value takes a peak value in each AF frame is unstable, the subject may be tracked with insufficient effectiveness, so that a scan area is broadened according to the difference.

Then processing related to determination using variation in movement amount of subject determined as a moving subject and setting of a scan area starts.

In step S1213, the difference between the maximum value and the minimum value of movement amount ($\Delta$FPmn obtained in step S803) is calculated. This calculation is not performed for the AF frame determined to be unreliable in step S802. The movement amount is evaluated by a value with plus or minus sign, not by an absolute value.

In step S1214, the difference is compared with predetermined value $\alpha$. If the difference is equal to or smaller than the predetermined value $\alpha$, the step deviates from the procedure starting from step S1215. If the difference is larger than the predetermined value $\alpha$, the step proceeds to step S1215 to check whether the difference is equal to or smaller than predetermined value $\beta$ which is larger than the predetermined value $\alpha$. If the difference is equal to or smaller than the predetermined value $\beta$, the step proceeds to step S1216 to increment the number of scan points by one. If the difference is larger than the predetermined value $\beta$, the step proceeds to step S1217 to increment the number of scan points by two. When the movement amount is unstable (when variation in movement amount among AF frames is large), the subject may be tracked with insufficient effectiveness, so that a scan area is broadened according to the difference between the maximum value and the minimum value of movement amount.

When deviating from the procedure from step S1203 to step S1216, the number of scan points and the scan interval are fixed, so that the scan area can be calculated by multiplying "the number of scan points−1" by the scan interval. Using the scan area set in this manner in step S810, scanning is performed in step S411.

When the scan area is broader than the whole area or extends further than the closest distance end or the infinite distance end, the processing similar to that in step S402 is performed.

The above processing is performed only when an AF frame is provided with an area of a normal size. When the face area detected by the face detection circuit 36 is smaller than a prescribed area or when a photographer intentionally sets a region smaller than the prescribed area, the processing described above is not performed. Even when the size of an AF frame on a display stays unchanged during electronic zoom, the processing is not performed if the number of pixels of the imaging element included in the AF frame is smaller than a prescribed value.

By the processing described above, the reduction in the speed of continuous shooting for shooting a still subject can be avoided, and for a moving subject, focusing on a background instead of on a main object can be avoided, so that focus is surely set on the main object.

A second embodiment is now described. The second embodiment is similar to the first embodiment in most aspects, but it is different from the first embodiment in that probability of a subject being a moving subject is estimated and according to the estimation, a predetermined value ThrAFNGCount which is compared with the value of the AFNG counter checked in step S416 in FIG. 4 is changed.

The structure and processing procedure of the imaging device in this embodiment is the same as that of the first embodiment. Therefore, processing is performed in sequences as illustrated in FIG. 4 and other drawings related thereto. In step S416, the value is compared with the predetermined value ThrAFNGCount. The predetermined value is not a constant value. The predetermined value changes according to a probability of the subject being a moving subject estimated from luminance, white balance (WB) result, distance of the subject with respect to the imaging device, focal length, and shooting mode.

The base value of the predetermined value is ThrBase which is smaller than that described in the first embodiment (for example, 2). The predetermined value ThrAFNGCount is increased according to conditions using Equation (6) up to be about four times the ThrBase.

$$\text{ThrAFNGCount} = \text{ThrAFNGBase} \times (1 + \text{Val}Tv + \text{Val}Av + \text{Val}ISO + \text{Val}WB + \text{Val}Vi) \quad \text{Equation (6)}$$

Although, in a shooting mode where the main subject is a moving subject, such as a sport mode, prediction of a future position of a subject continues whether the AF operation (searching of an in-focus position) succeeds or fails. So that ThrAFNGCount is set to a large value (for example, 10 times the ThrAFNGBase).

If a macro mode is selected to shoot a close subject, ThrAFNGCount is always set to ThrAFNGBase.

Figure 11:
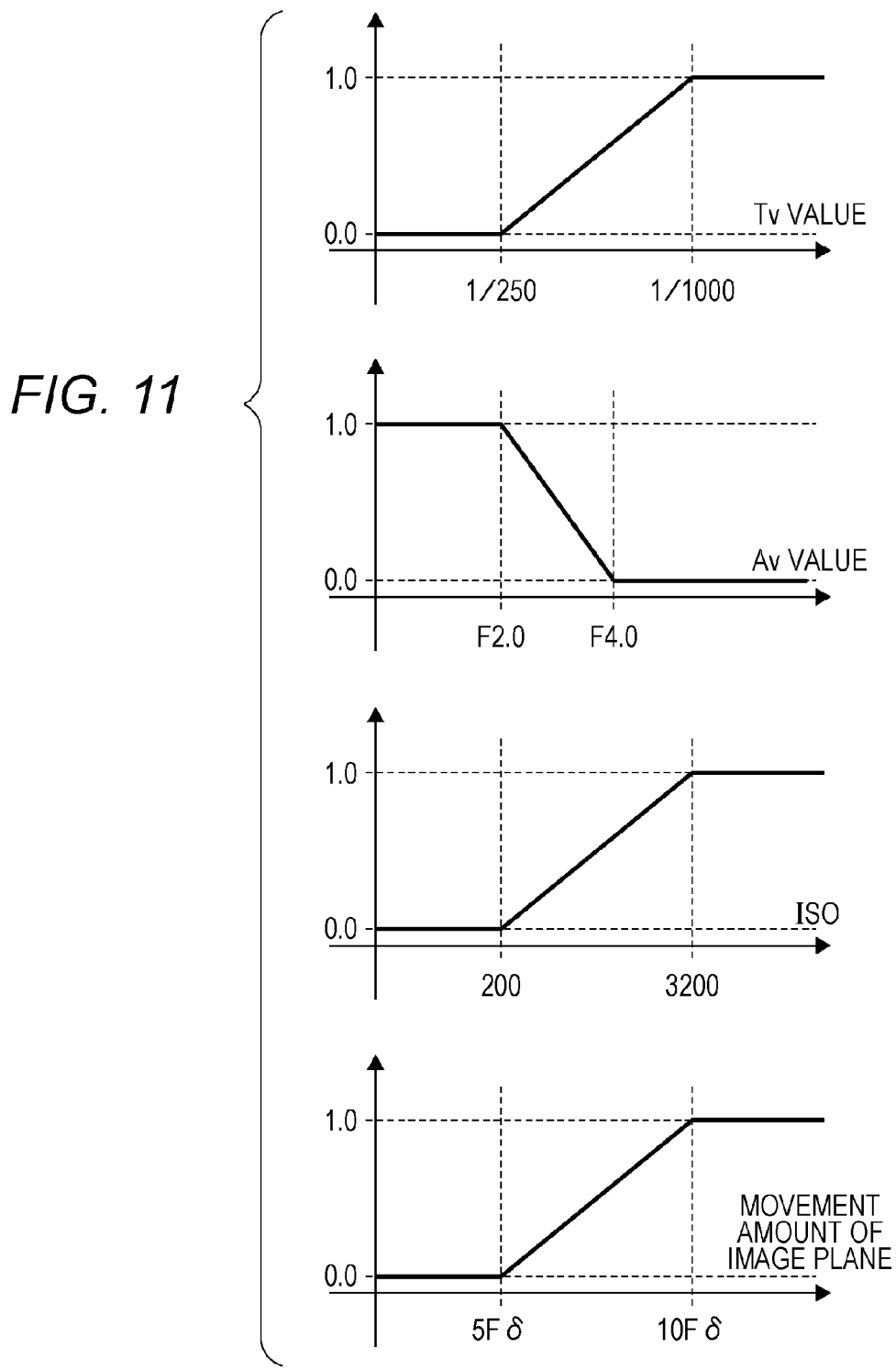
FIG. 11 illustrates charts explaining determination of predetermined values to be compared with AFNG counting during continuous shooting.

ValTv takes a value from 0 to 1 according to a shutter speed (Tv value) set by a photographer for a shutter speed priority AE mode. For example, as illustrated in FIG. 11, when Tv value is equal to or smaller than 1/250 seconds, ValTv is set to 0, when Tv value is equal to or larger than 1/1000 seconds, ValTv is set to 1, and between 1/250 seconds and 1/1000 seconds of Tv value, ValTv changes linearly.

ValAv takes a value from 0 to 1 according to an aperture value (Av value) set by a photographer for an aperture value priority AE mode. For example, as illustrated in FIG. 11, when Av value is equal to or smaller than F2.0 (to the open side of F2.0), ValAv is set to 1, if Av value is equal to or larger than F4.0 (to the closed side), ValAv is set to 0, and between F2.0 and F4.0 of Av value, ValAv changes linearly. A photographer may consider luminance of the object when setting the aperture value, so that the aperture value at a reference point is offset according to luminance. For example, when luminance increases by a step from a reference luminance of Lv12, the aperture value at the reference point is offset by 0.5 step. For Lv13, ValAv is 1 when Av value is equal to or smaller than F2.4, and ValAv is 0 when Av value is equal to or larger than F4.7. For Lv14, ValAv is 1 when Av value is equal to or smaller than F2.8, and ValAv is 0 when Av value is equal to or larger than F5.6.

Either one of ValTv and ValAv always takes a value of 0.

ValISO takes a value from 0 to 1 according to the ISO sensitivity intentionally set by a photographer. For example, as illustrated in FIG. 11, when ISO sensitivity is equal to or smaller than 200, ValISO is 0, when ISO sensitivity is equal to or larger than 3200, ValISO is 1, and between 200 and 3200 of ISO sensitivity, ValISO changes linearly.

When ISO sensitivity is set to HighAuto (automatically set to relatively high ISO sensitivity), 0.1×ThrAFNGBase is added.

When WB result indicates natural sunlight with a photometric value equal to or larger than a predetermined value, ValWB is 1, and for other WB result, ValWB is 0.

ValVi is determined according to the shifting speed of an image plane of a subject. ValVi is determined according to the movement amount of image plane Z of a subject moving at an assumed speed, where the shift amount of image plane Z is calculated from the subject distance obtained by converting the in-focus position obtained by scan AF processing (step S4 in FIG. 2 or step S411 in FIG. 4) and the focal length of the imaging lens sleeve 31.

Specifically, the moving amount of image plane Z is calculated from moving speed of subject v (m/s), subject distance L (m), continuous shooting interval t (sec), and focal length f(m) using the following equation.

$$Z = f^2 \cdot (-v \cdot t) \ge \{L \cdot (L - v \cdot t)\}$$

For example, as illustrated in FIG. 11, when Z is equal to or smaller than 5Fδ, ValVi is 0, when Z is equal to or larger than 10Fδ, ValVi is 1, and between 5Fδ and 10Fδ of Z, ValVi changes linearly. F is an open F-number and δ is a permissible confusion circle diameter.

The step proceeds in a manner similar to the first embodiment according to FIG. 4.

Furthermore, contrast information on subject, information on change in the size of face obtained by an output from the face detection circuit 36, and information on change in output from the AE processing circuit 13 may be used to change the predetermined value ThrAFNGCount.

The first and second embodiments are described above for an example compact digital camera. The present invention can also be used for other applications such as AF during live view of a digital video camera or a digital single-lens reflex camera.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-186857, filed Sep. 12, 2014, which is hereby incorporated by reference herein in its entirety.

What is claimed is:

1. A focusing control device comprising:
   a scan control unit configured to perform a scan operation to sequentially acquire a focus evaluation value from an image signal by moving a focusing lens;
   a focus determination unit configured to determine whether an in-focus position of the focusing lens can be obtained based on the focus evaluation value;
   a prediction unit configured to predict an in-focus position for a current exposure operation based on an in-focus position for a previous exposure operation, the prediction of an in-focus position being performed when a continuous main exposure operation is performed for shooting an image; and
   a prediction determination unit configured to determine whether prediction of the in-focus position is possible,
   wherein, when the prediction determination unit determines prediction of in-focus position for the current exposure operation is not possible, the scan control unit performs the scan operation to obtain an in-focus position based on an in-focus position of the previous exposure operation at which obtaining of an in-focus position was determined to be possible by the focus determination unit.

2. The focusing control device according to claim 1, wherein, when the prediction determination unit determines prediction to be impossible, the scan control unit performs the scan operation with a latest in-focus position being a center of a scan area to obtain an in-focus position, the latest in-focus position being among previous in-focus positions at which prediction of an in-focus position is determined to be possible by the focus determination unit.

3. The focusing control device according to claim 1, wherein the prediction determination unit determines prediction to be impossible when the focus determination unit determines that consecutive focusing for a plurality of times is impossible.

4. The focusing control device according to claim 3, further comprising
a subject determination unit configured to determine whether a subject being shot is a moving subject,
wherein the prediction determination unit changes a threshold value for determining whether prediction is impossible according to an output from the subject determination unit.

5. The focusing control device according to claim 4, wherein the prediction determination unit changes the threshold value for determining whether prediction is impossible according to at least one of set shooting mode, set shutter speed, set aperture value, set sensitivity, white balance result, detected subject distance, and set focal length.

6. An imaging device comprising:
a focusing lens;
a scan control unit configured to perform a scan operation to sequentially acquire a focus evaluation value from an image signal by moving a focusing lens;
a focus determination unit configured to determine whether an in-focus position of the focusing lens can be obtained based on the focus evaluation value;
a prediction unit configured to predict an in-focus position for a current exposure operation based on an in-focus position for a previous exposure operation, the prediction of an in-focus position being performed when continuous main exposure operation is performed for shooting an image; and
a prediction determination unit configured to determine whether prediction of the in-focus position is possible,
wherein, when the prediction determination unit determines prediction of in-focus position for the current exposure operation is not possible, the scan control unit performs the scan operation to obtain an in-focus position based on an in-focus position of the previous exposure operation at which obtaining of an in-focus position was determined to be possible by the focus determination unit.

7. A controlling method of focusing control device comprising:
performing a scan operation to sequentially acquire a focus evaluation value from an image signal by moving a focusing lens;
determining whether an in-focus position of the focusing lens can be obtained based on the focus evaluation value;
predicting an in-focus position for a current exposure operation based on an in-focus position for a previous exposure operation, the predicting of an in-focus position being performed when continuous main exposure operation is performed for shooting; and
determining whether prediction of the in-focus position is possible,
wherein, when prediction of the in-focus position for the current exposure operation is determined to be not possible, the scan operation is performed to obtain an in-focus position based on an in-focus position of the previous exposure operation at which obtaining of an in-focus position of the focusing lens was determined to be possible.

* * * * *